(12) United States Patent
Sole Rojals et al.

(10) Patent No.: US 9,491,469 B2
(45) Date of Patent: Nov. 8, 2016

(54) CODING OF LAST SIGNIFICANT TRANSFORM COEFFICIENT

(75) Inventors: Joel Sole Rojals, La Jolla, CA (US); Wei-Jung Chien, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 13/534,332

(22) Filed: Jun. 27, 2012

(65) Prior Publication Data
US 2013/0003835 A1 Jan. 3, 2013

Related U.S. Application Data

(60) Provisional application No. 61/502,269, filed on Jun. 28, 2011, provisional application No. 61/503,529, filed on Jun. 30, 2011, provisional application No. 61/550,775, filed on Oct. 24, 2011, provisional application No. 61/550,784, filed on Oct. 24, 2011.

(51) Int. Cl.
*H04N 7/30* (2006.01)
*H04N 7/32* (2006.01)
(Continued)

(52) U.S. Cl.
CPC ............ *H04N 19/13* (2014.11); *H04N 19/129* (2014.11); *H04N 19/196* (2014.11); *H04N 19/44* (2014.11); *H04N 19/463* (2014.11); *H04N 19/91* (2014.11)

(58) Field of Classification Search
CPC ............ H04N 7/50; H04N 7/30; H04N 7/34; H04N 7/12; H04N 7/26; H04N 7/32; H04N 1/415; H03M 7/00

USPC ............ 375/240.03, 240.18, 240.02, 240.16; 341/107
See application file for complete search history.

(56) References Cited

U.S. PATENT DOCUMENTS

| 1,679,903 A | 8/1928 | Holinger |
| 5,295,203 A | 3/1994 | Krause et al. |

(Continued)

FOREIGN PATENT DOCUMENTS

| CN | 1767649 A | 5/2006 |
| EP | 1041826 A1 | 10/2000 |

(Continued)

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

(Continued)

*Primary Examiner* — Jorge L Ortiz Criado
*Assistant Examiner* — Albert Kir
(74) *Attorney, Agent, or Firm* — Shumaker & Sieffert, P.A.

(57) ABSTRACT

A video encoder determines that the last significant coefficient (LSC) of a transform coefficient block occurs at a given ordinal position according to a coding scanning order. The video encoder generates a coordinate indicator that specifies the coordinates of a given transform coefficient in the transform coefficient block. The given transform coefficient occurs at the same ordinal position according to an assumed scanning order. A video decoder receives the coordinate indicator and converts the coordinate indicator into a scan-based LSC indicator. The scan-based LSC indicator indicates the ordinal position of the LSC.

32 Claims, 13 Drawing Sheets

(51) Int. Cl.
  *H03M 7/00* (2006.01)
  *H04N 19/13* (2014.01)
  *H04N 19/196* (2014.01)
  *H04N 19/129* (2014.01)
  *H04N 19/463* (2014.01)
  *H04N 19/91* (2014.01)
  *H04N 19/44* (2014.01)

(56) References Cited

U.S. PATENT DOCUMENTS

| | | | |
|---|---|---|---|
| 5,583,657 | A | 12/1996 | Jeong |
| 5,631,744 | A | 5/1997 | Takeuchi et al. |
| 5,818,877 | A | 10/1998 | Tsai et al. |
| 5,838,825 | A | 11/1998 | Obayashi et al. |
| 5,852,469 | A | 12/1998 | Nagai et al. |
| 6,301,304 | B1 | 10/2001 | Jing et al. |
| 6,385,343 | B1 | 5/2002 | Kuroda et al. |
| 6,646,578 | B1 | 11/2003 | Au |
| 6,680,974 | B1 | 1/2004 | Faryar et al. |
| 6,775,414 | B1 | 8/2004 | Fogg et al. |
| 6,856,701 | B2 | 2/2005 | Karczewicz et al. |
| 7,113,646 | B2 | 9/2006 | Youn |
| 7,369,066 | B1 | 5/2008 | Benzreba et al. |
| 7,376,280 | B2 | 5/2008 | Handley et al. |
| 7,379,608 | B2 | 5/2008 | Marpe et al. |
| 7,483,575 | B2 | 1/2009 | Fukuhara et al. |
| 7,522,774 | B2 | 4/2009 | Ramasastry et al. |
| 7,535,387 | B1 | 5/2009 | Delva |
| 7,609,904 | B2 | 10/2009 | Miller |
| 7,702,013 | B2 | 4/2010 | Schwarz et al. |
| 7,813,567 | B2 | 10/2010 | Sankaran |
| 7,843,998 | B2 | 11/2010 | Bjontegaard |
| 7,885,473 | B2 | 2/2011 | Sankaran |
| 7,920,629 | B2 | 4/2011 | Bjontegaard et al. |
| 8,275,045 | B2 | 9/2012 | Ye et al. |
| 8,311,119 | B2 | 11/2012 | Srinivasan |
| 8,446,301 | B2 * | 5/2013 | He et al. .................. 341/107 |
| 8,687,904 | B2 | 4/2014 | Sasai et al. |
| 8,861,599 | B2 | 10/2014 | Auyeung et al. |
| 9,100,651 | B2 | 8/2015 | Oh et al. |
| 9,167,253 | B2 | 10/2015 | Rojals et al. |
| 2002/0122483 | A1 | 9/2002 | Tanaka et al. |
| 2002/0163967 | A1 | 11/2002 | Youn et al. |
| 2003/0016876 | A1 | 1/2003 | Chai et al. |
| 2003/0048208 | A1 | 3/2003 | Karczewicz |
| 2003/0128886 | A1 | 7/2003 | Said |
| 2004/0131272 | A1 | 7/2004 | Kobayashi et al. |
| 2004/0184544 | A1 | 9/2004 | Kondo et al. |
| 2005/0036549 | A1 | 2/2005 | He et al. |
| 2005/0078754 | A1 * | 4/2005 | Liang et al. ............. 375/240.18 |
| 2006/0044317 | A1 | 3/2006 | Bourd et al. |
| 2006/0078049 | A1 | 4/2006 | Bao et al. |
| 2006/0126743 | A1 | 6/2006 | Takekawa et al. |
| 2006/0149801 | A1 | 7/2006 | Kirenko |
| 2006/0227865 | A1 | 10/2006 | Sherigar |
| 2007/0036223 | A1 | 2/2007 | Srinivasan |
| 2007/0071331 | A1 | 3/2007 | Liu |
| 2007/0285285 | A1 | 12/2007 | Puri et al. |
| 2008/0013633 | A1 | 1/2008 | Ye et al. |
| 2008/0089425 | A1 | 4/2008 | Karczewicz |
| 2008/0152015 | A1 | 6/2008 | Benzreba et al. |
| 2008/0219578 | A1 | 9/2008 | Lee |
| 2008/0310504 | A1 | 12/2008 | Ye et al. |
| 2008/0310507 | A1 | 12/2008 | Ye et al. |
| 2008/0310745 | A1 | 12/2008 | Ye et al. |
| 2009/0154820 | A1 | 6/2009 | Li et al. |
| 2009/0175331 | A1 | 7/2009 | Karczewicz et al. |
| 2009/0175332 | A1 | 7/2009 | Karczewicz et al. |
| 2009/0202158 | A1 | 8/2009 | Hwang et al. |
| 2009/0232204 | A1 | 9/2009 | Lee et al. |
| 2009/0273706 | A1 | 11/2009 | Tu et al. |
| 2009/0273796 | A1 | 11/2009 | Garben et al. |
| 2010/0020867 | A1 | 1/2010 | Wiegand et al. |
| 2010/0046626 | A1 | 2/2010 | Tu et al. |
| 2010/0097248 | A1 | 4/2010 | Sze et al. |
| 2010/0111432 | A1 | 5/2010 | Mohr |
| 2010/0118971 | A1 | 5/2010 | Tanida et al. |
| 2010/0141489 | A1 | 6/2010 | Reznik |
| 2010/0143853 | A1 | 6/2010 | Cohen |
| 2010/0150226 | A1 | 6/2010 | Hallapuro et al. |
| 2010/0208826 | A1 | 8/2010 | Fogg et al. |
| 2010/0324912 | A1 | 12/2010 | Choo et al. |
| 2011/0001643 | A1 | 1/2011 | Sze et al. |
| 2011/0080956 | A1 | 4/2011 | Zhou et al. |
| 2011/0090955 | A1 | 4/2011 | Liu et al. |
| 2011/0096834 | A1 | 4/2011 | Cheon et al. |
| 2011/0097003 | A1 | 4/2011 | Alshina et al. |
| 2011/0103489 | A1 | 5/2011 | Takada |
| 2011/0206135 | A1 | 8/2011 | Drugeon et al. |
| 2011/0206289 | A1 | 8/2011 | Dikbas et al. |
| 2011/0243220 | A1 | 10/2011 | Seregin et al. |
| 2011/0249726 | A1 | 10/2011 | Nguyen et al. |
| 2011/0249755 | A1 | 10/2011 | Shibahara et al. |
| 2011/0255799 | A1 | 10/2011 | Omori |
| 2011/0268183 | A1 | 11/2011 | Sole et al. |
| 2012/0008683 | A1 | 1/2012 | Karczewicz et al. |
| 2012/0027081 | A1 * | 2/2012 | Endresen et al. ........ 375/240.03 |
| 2012/0082233 | A1 | 4/2012 | Sze et al. |
| 2012/0140813 | A1 | 6/2012 | Sole Rojals et al. |
| 2012/0140814 | A1 | 6/2012 | Sole Rojals et al. |
| 2012/0163456 | A1 | 6/2012 | Coban et al. |
| 2012/0163469 | A1 | 6/2012 | Kim et al. |
| 2012/0163472 | A1 | 6/2012 | Sole Rojals et al. |
| 2012/0183052 | A1 | 7/2012 | Lou et al. |
| 2012/0207400 | A1 | 8/2012 | Sasai et al. |
| 2012/0236929 | A1 | 9/2012 | Liu |
| 2012/0262313 | A1 | 10/2012 | He et al. |
| 2012/0269263 | A1 | 10/2012 | Bordes et al. |
| 2012/0288003 | A1 | 11/2012 | Do et al. |
| 2013/0051459 | A1 | 2/2013 | Kirchhoffer et al. |
| 2013/0051472 | A1 | 2/2013 | Wiegand et al. |
| 2013/0058407 | A1 | 3/2013 | Sole et al. |
| 2013/0114731 | A1 | 5/2013 | Lee et al. |
| 2013/0343454 | A1 * | 12/2013 | Yeo et al. ................ 375/240.03 |
| 2014/0341274 | A1 | 11/2014 | Sole et al. |
| 2014/0362925 | A1 | 12/2014 | Nguyen et al. |

FOREIGN PATENT DOCUMENTS

| | | |
|---|---|---|
| EP | 1679903 A2 | 7/2006 |
| EP | 1768415 A1 | 3/2007 |
| EP | 2182732 A1 | 5/2010 |
| EP | 2592832 A2 | 5/2013 |
| EP | 2677750 A1 | 12/2013 |
| JP | 2003224851 A | 8/2003 |
| JP | 2006211304 A | 8/2006 |
| RU | 2407219 C2 | 12/2010 |
| WO | 2007043583 A1 | 4/2007 |
| WO | WO2007063472 A2 | 6/2007 |
| WO | WO2009075445 A1 | 6/2009 |
| WO | 2009134575 A2 | 11/2009 |
| WO | 2010018138 A1 | 2/2010 |
| WO | WO2010131546 A1 | 11/2010 |
| WO | 2010143853 A2 | 12/2010 |
| WO | 2011133002 A2 | 10/2011 |
| WO | WO2011128303 A2 | 10/2011 |
| WO | 2012005551 A2 | 1/2012 |
| WO | 2012051033 A1 | 4/2012 |
| WO | 2013006446 A1 | 1/2013 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

(56) References Cited

OTHER PUBLICATIONS

Bross et al., "WD5: Working Draft 5 of High-Efficiency Video Coding," 7th Meeting: Geneva, Switzerland, Nov. 21-30, 2011, JCTVC-G1103_d2, 214 pp.
Budagavi et al.,"Parallel context processing techniques for high coding efficiency entropy coding in HEVC", JCT-VC Meeting; Jul. 21, 2010-Jul. 28, 2010; Geneva; (Joint Collaborativeteam on Video Coding of ISO/IEC JTC1/SC29/WGII and ITU-T SG.16 ); URL:http://wftp3.itu.int/av-arch/jctvc-sit e/ 3 No. JCTVC-B088, XP030007668, ISSN: 0000-0046, 11 pp.
International Search Report and Written Opinion—PCT/US2012/044629—ISA/EPO—Sep. 24, 2012, 14 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Sole et al., "CE11: Unified scans for the significance map and coefficient level coding in high efficiency", JCTVC-F288, Joint Collaborative Team on Video Coding (JCT-VC) of ITU-T SG16 WP3 and ISO/IEC JTC1/SC29/WG11, 6th Meeting: Torino (Italy), Jul. 14-22, 2011, 9 pp.
Joshi, et al., "CE7: Mode dependent intra residual coding", MPEG Meeting; Mar. 21, 2011-Mar. 25, 2011; Geneva; (Motion Picture Expert Group or ISO/IEC JTC1/SC29/WG11),No. m19613, XP030048180, 9 pp.
Marpe et al., "Unified PIPE-Based Entropy Coding for HEVC", JCT-VC Meeting; MPEG Meeting;Jul. 14, 2011-Jul. 22, 2011; Torino; (Joint Collaborative Team on Video Coding of ISO/IEC JTC1/SC29/WG11 and ITU-T SG.16 );URL:http://wftp3.itu.int/av-arch/jctvc-site/,No. JCTVC-F268, XP030009291, 16 pp.
Nguyen et al., "Context Set Selection for Coefficient Level Coding", JCT-VC Meeting; MPEG Meeting; Feb 1, 2012-Feb. 10, 2012; San Jose; (Joint Collaborative Team on Video Coding of ISO/I EC JTCI/SC29/WGII and ITU-T SG. 16 ) ; URL: http://wftp3.itu.int/av-arch/jctvc-site/, No. JCTVC-H0404, XP030111431, 8 pp.
Nguyen, et al., "Reduced-complexity entropy coding of transform coefficient levels using a combination of VLC and PIPE", 95. MPEG Meeting; Jan. 24, 2011-Jan. 28, 2011;Daegu; (Motion Picture Expert Group or ISO/IEC JTC1/SC29/WG11),No. m19102, XP030047669, 9 pp.
Zhang, et al., "NON-CE1: On CABAC parsing throughput", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-H0533, XP030111560, 7 pp.
Sole, et al., "CE11: Parallel Context Processing for the significance map in high coding efficiency", MPEG Meeting; Mar. 21, 2011-Mar. 25, 2011; Geneva; (Motion Picture Expert Group or ISO/IEC JTC1/SC29/WG11),No. m19866, XP030048433, 5 pp.
Sole, et al., "CE11: Removal of the parsing dependency of residual coding on intra mode", MPEG Meeting; Nov. 28, 2011-Dec. 2, 2011; Geneva; (Motion Picture Expert Group or ISO/IEC JTC1/SC29/WG11),No. m21883, XP030050446, 6 pp.
Sole, et al., "Parallel Context Processing for the significance map in high coding efficiency ", MPEG Meeting; Jan. 24, 2011-Jan. 28, 2011; Daegu; (Motion Picture Expert Group or ISO/IEC JTC1/SC29/WG11) No. m19026, XP030047594, 4 pp.
Sole, et al.,"Parallel processing of residual data in HE", JCT-VC Meeting; MPEG Meeting; Jul. 14, 2011-Jul. 22, 2011; Torino; (Joint Collaborative Team on Video Coding of ISO / IEC JTCI/SC29/ WGII and ITU-T SG. 16 ) ; URL: http://wftp3.itu.int/av-arch/jctvc-site/, No. JCTVC-F552, XP03000957, 3 pp.
Sole, et al., "Removal of the parsing dependency of residual coding on intra mode", JCT-VC Meeting; MPEG Meeting;Jul. 14, 2011-Jul. 22, 2011; Torino; (Joint Collaborative Team on Video Coding of ISO/IEC JTC1/SC29/WG11 and ITU-T SG.16 ); URL:http://wftp3.itu.int/av-arch/jctvc-site/,No. JCTVC-F550, XP030009573, 3 pp.
Sole, et al.,"CE11: Scanning Passes o f Residual Data in HE", JCT-VC Meeting; MPEG Meeting; Nov. 21, 2011-Nov. 30, 2011; Geneva; (Joint Collaborative Team on Video Coding of ISO / IEC JTCI/SC29/WG11 and ITU-T SG. 16 ) ; URL: http://wftp3.itu.int/av-arch/jctvc-site/, , No. JCTVC-G320, XP030110304, 3 pp.
Sze: CE11: Coding efficiency of tools i n HHI Transform—Coding (JCTVC-A116), MPEG Meeting; Jan. 24, 2011- Jan. 28, 2011; Daegu; (Motion Picture Expert Group or ISO / IEC JTCI/SC29/ WGII), No. m18949, XP030047518, 8 pp.
Sze, et al., "Parallel Context Processing of Coefficient Level", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16 );URL: http://wftp3.itu.int/av-arch/jctvc-site/, No. JCTVC-F130, XP030009153, 4 pp.
U.S. Appl. No. 13/565,621, by Sole Rojals, et al., filed Aug. 2, 2012.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD1: Working Draft 1 of High-Efficiency Video Coding", JCTVC-C403, 3rd Meeting: Guangzhou, CC, Oct. 7-15, 2010, 137 pp.
Second Written Opinion from International Application No. PCT/US2012/044629, dated Jun. 3, 2013, 4 pp.
International Preliminary Report on Patentability from International Application No. PCT/US2012/044629, 19 pp.
Anonymous, "Test Model Under Consideration", Joint Collaborative Team on Video Coding, Document: JCTVC-B205, Jul. 21-28, 2010, 152 pp.
Bjontegaard et al., "Context-Adaptive VLC (CVLC) Coding of Coefficients," Joint Video Team, JVT-C028 May 6-10, 2002, 8 pp.
Choi et al., "Adaptive Coefficient Scanning Based on the Intra Prediction Mode", ETRI Journal, vol. 29, No. 5, Oct. 2007, 3 pp.
Davies, "BBC's Response to the Call for Proposals on Video Compression Technologies," Joint Collaborative Team on Video Coding, JCTVC-A125, Apr. 15-23, 2010, 30 pp.
Davies et al., "Suggestion for a Test Model", Joint Collaborative Team on Video Coding, JCTVC-A033, Apr. 15-23, 2010, pp. 30.
International Telecommunication Union, "Advanced video coding for generic audiovisual services," Telecommunication Standardization Sector, H.264, Mar. 2010, 669 pp.
Jia et al., "A most probable scan mode decision for H.264/AVC inter picture coding", IEEE International Conference on Computer Science and Information Technology, Aug. 8, 2009, 5 pp.
Lee et al., "An Efficient Encoding of DCT Blocks with Block-Adaptive Scanning." IEICE Transactions on Communications, No. 12, Dec. 1994, 6 pp.
Kim et al., "Efficient entropy coding scheme for H.264/AVC lossless video coding," Elsevier, Image Communication, Apr. 24, 2010, 10 pp.
Marpe et al., "Context-Based Adaptive Binary Arithmetic Coding in the H.264/AVC Video Compression Standard", IEEE Transactions on Circuits and Systems for Video Technology, vol. 13, No. 7, Jul. 2003, 17 pp.
McCann et al., "Samsung's Response to the Call for Proposals on Video Compression Technology," Joint Collaborative Team on Video, Document: JCTVC-A124, Apr. 15-23, 2010, 42 pp.
Schaar-Mitrea et al., "Novel Embedded Compression Algorithm for Memory Reduction in MPEG codecs" Conference on Visual Communications and Image Processing, SPIE, Jan. 1999, 10 pp.
Min et al., "Adaptive significance map coding for large transform", Joint Collaborative Team on Video Coding, JCTVC-F598, Jul. 14-22, 2011, 3 pp.
Misra et al., "A Memory Efficient Method for Fast Transposing Run-length Encoded Images", Proceedings of the Fifth International Conference on Document Analysis and Recognition, IEEE, Sep. 1999, 4 pp.
Nguyen et al, "Improved Context Modeling for Coding Quantized Transform Coefficients in Video Compression", Picture Coding Symposium, IEEE, Dec. 8-10, 2010, 4 pp.
Puri et al., "Improvements in DCT Based Video Coding", Proceedings of SPIE, vol. 3024, Feb. 12, 1997, 13 pp.
Seregin et al. "Low-complexity adaptive coefficients scanning", Joint Collaborative Team on Video Coding, JCTVC-C205v3, Oct. 7-15, 2010, 4 pp.
Shim et al., "Adaptive Scanning Patterns for Intra Prediction", International Telecommunication Union Telecommunications Standardization Sector, VCEG-AH14, Jan. 12-13, 2008, 8 pp.
Sole Rojals et al., "Parallel Context Processing for the significance map in high coding efficiency", Joint Collaborative Team on Video Coding, JCTVC-D262, Jan. 20-28, 2011, 4 pp.

(56) References Cited

OTHER PUBLICATIONS

Sole Rojals et al, "Unified scans for the significance map and coefficient level coding in high coding efficiency", Joint Collaborative Team on Video Coding, JCTVC-E335, Mar. 16-23, 2011, 4 pp.
Sole Rojals et al. "Parallel Context Processing for the significance map in high coding efficiency", Joint Collaborative Team on Video Coding, JCTVC-D262 PowerPoint, Jan. 20-28, 2011, 8 pp.
Davies, "Unified scan processing for high efficiency coefficient coding", Joint Collaborative Team on Video Coding, JCTVC-D219, Jan. 20-28, 2011, 5 pp.
U.S. Appl. No. 13/413,472, by Joel Sole Rojals, filed Mar. 6, 2012.
U.S. Appl. No. 13/413,497, by Joel Sole Rojals, filed Mar. 6, 2012.
U.S. Appl. No. 13/413,514, by Joel Sole Rojals, filed Mar. 6, 2012.
U.S. Appl. No. 13/413,526, by Joel Sole Rojals, filed Mar. 6, 2012.
U.S. Appl. No. 13/534,306, by Joel Sole Rojals, filed Jun. 27, 2012.
Wiegand et al., "WD3: Working Draft 3 of High-Efficiency Video Coding," Joint Collaborative Team on Video Coding, Document: JCTVC-E603, Mar. 16-23, 2011,193 pp.
Winken et al., "Video Coding Technology Proposal by Fraunhofer HHI", Joint Collaborative Team on Video Coding, JCTVC-A116 PowerPoint, Apr. 24, 2010, 28 pp.
Winken et al., "Video coding technology proposal by Fraunhofer HHI", Joint Collaborative Team on Video Coding, Document: JCTVC-A116, Apr. 15-23, 2010, 44 pp.
Ye et al., "Improved intra coding", International Telecommunication Union Telecommunications Standardization Sector, VCEG-AG11, Oct. 20, 2007, 6 pp.
Yu et al., "Probability Modeling for Encoding Quantized Transform Coefficients", 25. Picture Coding Symposium, IEEE, Apr. 24, 2006, 6 pp.
Zhang et al., "Context-Based Entropy Coding in AVS Video Coding Standard", Signal Processing: Image Communication, Elsevier Science Publishers, vol. 24, No. 4, Jun. 2, 2008, 14 pp.
Marpe et al., "Novel entropy coding concept," Document JCTVC-A032, 1st Meeting: Dresden, DE, Apr. 15-23, 2010, 17 pp.
Ye et al., "Improved H.264 Intra Coding Based on Bi-Directional Intra Prediction, Directional Transform, and Adaptive Coefficient Scanning," 2008, 4 pp.
Sasai, et al., "Simplified Context Modeling for Transform Coefficient Coding", Joint Collaborative Team on Video Coding (JCT-VC) of ITU-T SG16 WP3 and ISO/IEC JTC1/SC29/WG11 JCTVC-D185, Jan. 2011, 5 pp.
Sze, "Context selection complexity in HEVC CABAC", JCT-VC Meeting; MPEG Meeting; Jan. 20, 2011-Jan. 28, 2011; Daegu;(Joint Collaborative Team on Video Coding of ISO/IEC JTC1/SC29/WG11AND ITU-T SG.16 ); URL: http://wftp3.itu.int/av-arch/jctvc-site/ No. JCTVC-D244, XP030008284, ISSN: 0000-0013, 3 pp.
Zheng et al., "CE11: Mode Dependent Coefficient Scanning", JCT-VC Meeting; MPEG Meeting; Jan. 20, 2011-Jan. 28, 2011; Daegu; (Joint Collaborative Team on Video Coding of ISO/IEC JTC1/SC29/WG11AND ITU-T SG.16); No. JCTVC-D393, XP030008432, ISSN: 0000-0013, URL: http://wftp3.itu.int/av-arch/jctvc-site, 4 pp.
Budagavi et al., "TE8: TI Parallel context processing (PCP) proposal," JCTVC-0062, Oct. 7-15, 2010, 7 pp.
International Telecommunication Union, "ITU-T H.265, Series H: Audiovisual and Multimedia Systems, Infrastructure of audiovisual services—Coding of moving video, Advanced video coding for generic audiovisual services," Apr. 2013, 317 pp.
Seregin et al., "Low-complexity adaptive coefficients scanning", Joint Collaborative Team on Video Coding (JCT-VC) of ITU-T SG16 WP3 and ISO/IEC JTC1/SC29/WG11, vol. JCTVC-C205, Oct. 7-15, 2010, XP055012689, 4 pp.
Office Action from counterpart European Application No. 12 732 936.5-1908, dated Oct. 2, 2014, 3 pp.
Sole, et al., "Non-CE11: Diagonal sub-block scan for HE residual coding", Joint Collaborative Team on Video Coding (JCT-VC) of ITU-T SG16 WP3 and ISO/IEC JTC1/SC291VVG11, 7th Meeting: Geneva, CH, JCTVC-G323_r3, 9 pp.
Auyeung et al., "Context reduction of the last transform position in JCTVC-D262 for CE11.1", 5. JCT-VC meeting; 96. Mpeg meeting; Mar. 16, 2011-Mar. 23, 2011; Geneva; (Joint Collaborative Team on Video Coding of ISO/IEC JTC11SC29NVG11AND ITU-T SG.16 ); URL:http://wftp3.itu.int/av-arch/jctvc-site/" No. JCTVC-E344, Mar. 11, 2011 (Mar. 3, 2011), XP030008850, ISSN: 0000-0005.
ITU-T H.265, Series H: Audiovisual and Multimedia Systems, Infrastructure of audiovisual services—Coding of moving video, High efficiency video coding, The International Telecommunication Union, Oct. 2014, 540 pp.
Joshi, R., et al, "Mode dependent intra residual coding [online]," Joint Collaborative Team on Video Coding (JCT-VC) of ITU-T SG16 WP3 and ISO/IEC JTC1/SC29NVG11 JCTVC-D392 Jan. 2011.
Qualcomm Technologies Inc: "Snapdragon 810 Processor Product Brief, "retrieved from https://www.qualcomm.com/documents/snapdragon-810-processor-product-brief, May 28, 2014, 2 pp.
"Recommendation ITU-T H.264, Advanced video coding for generic audiovisual services", Series H: Audiovisual and Multimedia Systems, Infrastructure of audiovisual services—Coding of moving video, Mar. 2010, p. 62.
Seregin V., et.al., "Utilisation of CABAC equal probability mode for intra modes coding", Joint Collaborative Team on Video Coding (JCT-VC) of ITU-T SG16 WP3 and ISO/IEC JTC1/SC29NVG11, version 3, Document: JCTVC-F376, Jul. 16, 2011.
Wei Y., et al., "Context Probability Modeling for Encoding Quantized Transform Coefficients", PCS2006, Entropy Coding Special Session, Apr. 30, 2006, 5 Pages, [Retrieved on Dec. 4, 2014], Retrieved from the Internet: URL: http://read.pudn.com/downloads94/ebook/370478/Context%20Probability%20Modeling%20for%20Encoding%20Quantized%20Transform%20Coefficients%20web.pdf.
Sze et al., "CE11: Parallelization of HHI_TRANSFORM_CODING (Fixed Diagonal Scan from C227)", 6th Meeting, Jul. 14-22, 2011, Torino, IT; (Joint Collaborative Team on Video Coding (JCT-VC)of ITU-T SG16 WP3 and ISO/IEC UTC1/SC29/WG11); JCTVC-F129, Jul. 22, 2011, 5 pp.
Sze et al., "CE11: Parallelization of HHI_TRANSFORM_CODING (Fixed Diagonal Scan) (JCTVC-F128)", 6th Meeting, Jul. 14-22, 2011, Torino, IT; (Joint Collaborative Team on Video Coding (JCT-VC)of ITU-T SG16 WP3 and ISO/IEC UTC1/SC29/WG11); JCTVC-F129, Jul. 22, 2011, 6 slides.
Sole et al., "CE11: Removal of the parsing dependency of residual coding on intra mode", 7th Meeting, Nov. 21-30, 2011, Geneva, CH; (Joint Collaborative Team on Video Coding (JCT-VC) of ITU-T SG16 WP3 and ISO/IEC UTC11SC29NVG11); JCTVC-G321, Nov. 19, 2011, 6 pp.
Seregin et al., "Intra mode parsing without access neighbouring information", 6th Meeting, Jul. 14-22, 2011, Torino, IT; (Joint Collaborative Team on Video Coding (JCT-VC) of ITU-T SG16 WP3 and ISO/IEC JTC1/SC29/WG11), JCTVC-378, Jul. 18, 2011, 14 pp.
Seregin et al., "Intra mode parsing without access neighbouring information", 6th Meeting, Jul. 14-22, 2011, Torino, IT; (Joint Collaborative Team on Video Coding (JCT-VC) of ITU-T SG16 WP3 and ISO/IEC JTC1/SC29/WG11), Power Point Presentation for JCTVC-378, Jul. 18, 2011, 8 pp.
Chien et al., "Parsing friendly intra mode coding", 6th Meeting, Jul. 14-22, 2011, Torino, IT; (Joint Collaborative Team on Video Coding (Jct-Vc) of ITU-T SG16 WP3 and ISO/IEC JTC11SC291WG11), JCTVC-F459, Jul. 15, 2011, 5 pp.
Chien et al., "JCTVC-F459: Parsing friendly intra mode coding", 6th Meeting, Jul. 14-22, 2011, Torino, IT; (Joint Collaborative Team on Video Coding (JCT-VC) of ITU-T SG16 WP3 and ISO/IEC JTC1/SC29/WG11), JCTVC-F459, Jul. 15, 2011, 9 pp.
An, et al., "A Novel Fast DCT Coefficient Scan Architecture," Picture Coding Symposium, May 5, 2009-May 8, 2009; Chicago, May 6, 2009, XP030081792, 5 pp.

\* cited by examiner

| | | | |
|---|---|---|---|
| 6 | 2 | 1 | 0 |
| 3 | 3 | 0 | 0 |
| 1 | 0 | 0 | 0 |
| 0 | 0 | 0 | 0 |

FIG. 2

| 1 | 1 | 1 | 0 |
|---|---|---|---|
| 1 | 1 | 0 | 0 |
| 1 | 0 | 0 | 0 |
| 0 | 0 | 0 | 0 |

FIG. 4

CODING OF LAST SIGNIFICANT TRANSFORM COEFFICIENT

CROSS-REFERENCE TO RELATED APPLICATIONS

This application claims the benefit of U.S. Provisional Application No. 61/502,269, filed Jun. 28, 2011, U.S. Provisional Application No. 61/503,529, filed Jun. 30, 2011, U.S. Provisional Application No. 61/550,775, filed Oct. 24, 2011, and U.S. Provisional Application No. 61/550,784, filed Oct. 24, 2011, the entire content of which are hereby incorporated by reference.

TECHNICAL FIELD

This disclosure relates to techniques for encoding and decoding video data. More particularly, this disclosure relates to signaling positions of significant transform coefficients that represent information in the video data.

BACKGROUND

Digital video capabilities may be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block may be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

SUMMARY

This disclosure relates generally to techniques for signaling a position of a last significant coefficient (LSC) in a block of transform coefficients during video coding. For example, the techniques provide for a video encoder that determines that the LSC of a two-dimensional (2D) transform coefficient block occurs at a given ordinal position when the transform coefficient block is scanned according to a coding scanning order. The video encoder generates a coordinate indicator that specifies the coordinates of a given transform coefficient in the transform coefficient block. The given transform coefficient occurs at the given ordinal position when the transform coefficient block is scanned according to an assumed scanning order. The video encoder performs an entropy encoding operation to generate an encoded version of the coordinate indicator. The video encoder may output the encoded version of the coordinate indicator.

In another example, the techniques provide for a video decoder that receives the coordinate indicator. The video decoder converts the coordinate indicator into a scan-based LSC indicator. The scan-based LSC indicator indicates the given ordinal position. The video decoder may convert the coordinate indicator into the scan-based LSC indicator using an algorithm that outputs the given ordinal position of the coordinates according to the assumed scanning order. The assumed scanning order may be different than the actual coding scanning order.

In one aspect, this disclosure describes a method for encoding video data. The method comprises determining that a last significant transform coefficient of a transform coefficient block occurs at a given ordinal position when the transform coefficient block is scanned according to a coding scanning order. The transform coefficient block comprises transform coefficients associated with the video data. The method also comprises generating a coordinate indicator that specifies coordinates of a given transform coefficient in the transform coefficient block. The given transform coefficient occurs at the given ordinal position when the transform coefficient block is scanned according to an assumed scanning order. The method also comprises performing an entropy encoding operation on the coordinate indicator to generate an entropy encoded version of the coordinate indicator. In addition, the method comprises outputting the entropy encoded version of the coordinate indicator.

In another aspect, this disclosure describes a method for decoding video data. The method comprises receiving a coordinate indicator that specifies coordinates of a given position in a transform coefficient block. The given position occurs at a given ordinal position when the transform coefficient block is scanned according to an assumed scanning order. A last significant transform coefficient of the transform coefficient block occurs at the given ordinal position when the transform coefficient block is scanned according to a coding scanning order. The transform coefficient block comprises transform coefficients associated with the video data. The method also comprises converting the coordinate indicator into a scan-based LSC indicator that specifies the given ordinal position.

In another aspect, this disclosure describes a video encoding device that comprises one or more processors configured to determine that a last significant transform coefficient of a transform coefficient block occurs at a given ordinal position when the transform coefficient block is scanned according to a coding scanning order. The transform coefficient block comprises transform coefficients. The one or more processors are also configured to generate a coordinate indicator that specifies coordinates of a given transform coefficient in the transform coefficient block. The given coefficient occurs at the given ordinal position when the transform coefficient block is scanned according to an assumed scanning order. In addition, the one or more processors are configured to perform an entropy encoding operation on the coordinate indicator to generate an entropy encoded version of the coordinate indicator. The one or more processors are also configured to output the entropy encoded version of the coordinate indicator.

In another aspect, this disclosure describes a video decoding device comprising one or more processors configured to receive a coordinate indicator that specifies coordinates of a given position in a transform coefficient block. The given position occurs at a given ordinal position when the transform coefficient block is scanned according to an assumed scanning order. A last significant transform coefficient of the transform coefficient block occurs at the given ordinal position when the transform coefficient block is scanned according to a coding scanning order. The transform coefficient block comprises transform coefficients. The one or more processors are also configured to convert the coordinate indicator into a scan-based LSC indicator that specifies the given ordinal position.

In another aspect, this disclosure describes a video encoding device that comprises means for determining that a last significant transform coefficient of a transform coefficient block occurs at a given ordinal position when the transform coefficient block is scanned according to a coding scanning order, the transform coefficient block comprising transform coefficients. The video encoding device also comprises means for generating a coordinate indicator that specifies coordinates of a given transform coefficient in the transform coefficient block. The given transform coefficient occurs at the given ordinal position when the transform coefficient block is scanned according to an assumed scanning order. The video encoding device also comprises means for performing an entropy coding operation on the coordinate indicator to generate an entropy encoded version of the coordinate indicator. In addition, the video encoding device comprises means for outputting the entropy encoded version of the coordinate indicator.

In another aspect, this disclosure describes a video decoding device that comprises means for receiving a coordinate indicator that specifies coordinates of a given position in a transform coefficient block. The given position occurs at a given ordinal position when the transform coefficient block is scanned according to an assumed scanning order. A last significant transform coefficient of the transform coefficient block occurs at the given ordinal position when the transform coefficient block is scanned according to a coding scanning order, the transform coefficient block comprising transform coefficients. The video decoding device also comprises means for converting the coordinate indicator into a scan-based LSC indicator that specifies the given ordinal position.

In another aspect, this disclosure describes a computer program product that comprises a computer-readable storage medium having instructions stored thereon that configure one or more processors to determine that a LSC of a transform coefficient block occurs at a given ordinal position when the transform coefficient block is scanned according to a coding scanning order, the transform coefficient block comprising transform coefficients. The instructions also configure the one or more processors to generate a coordinate indicator, the coordinate indicator specifying coordinates of a given transform coefficient in the transform coefficient block. The given transform coefficient occurs at the given ordinal position when the transform coefficient block is scanned according to an assumed scanning order. The instructions also configure the one or more processors to perform an entropy coding operation on the coordinate indicator to generate an entropy encoded version of the coordinate indicator. In addition, the instructions configure the one or more processors to output the entropy encoded version of the coordinate indicator.

In another aspect, this disclosure describes a computer program product that comprises a computer-readable storage medium having instruction stored thereon that configure one or more processors to receive a block-based LSC indicator that specifies coordinates of a given position in a two-dimensional transform coefficient block. The given position occurs at a given ordinal position when the transform coefficient block is scanned according to an assumed scanning order. An LSC of the transform coefficient block occurs at the given ordinal position when the transform coefficient block is scanned according to a coding scanning order. The transform coefficient block comprises transform coefficients that represent information of the video data. In addition, the instructions configure the one or more processors to convert the coordinate indicator into a scan-based LSC indicator that specifies the given ordinal position.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

FIG. 2 is a conceptual diagram that illustrates an example transform coefficient block.

FIG. 4 is a conceptual diagram that illustrates a two-dimensional representation of an example significance map for the transform coefficient block of FIG. 2.

DETAILED DESCRIPTION

Figure 1:
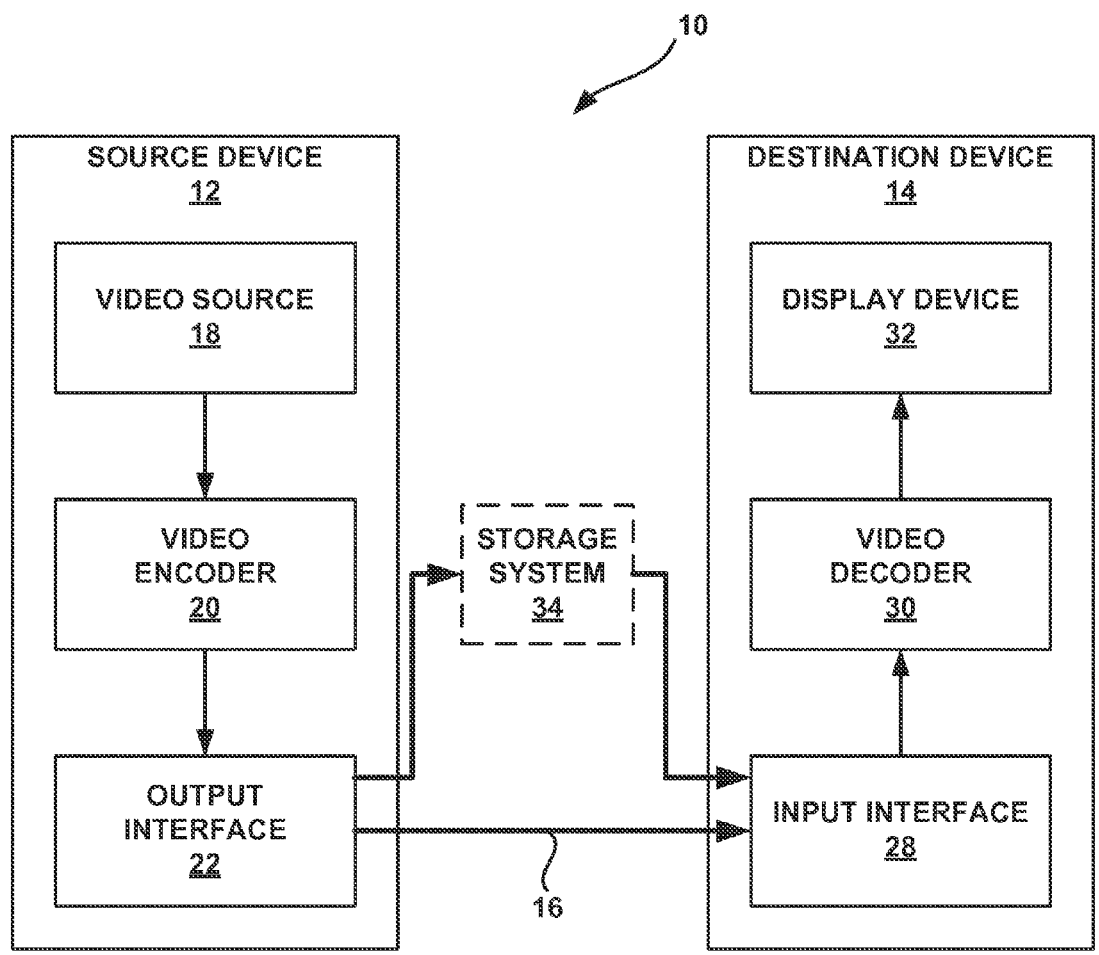
FIG. 1 is a block diagram that illustrates an example video coding system.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

As described herein, a video encoder encodes video data. As part of encoding the video data, the video encoder may generate a two-dimensional (2D) transform coefficient block. The video encoder may determine that a last significant transform coefficient of the transform coefficient block occurs at a given ordinal position according to a coding scanning order. In other words, if the transform coefficients of the transform coefficient block were sequenced according to the coding scanning order, the last significant transform coefficient would be at the given ordinal position. For example, the video encoder may determine that the last significant transform coefficient of the transform coefficient block occurs at the n'th position according to the coding scanning order. The ordinal position of a transform coefficient may be the relative position of the transform coefficient in a sequence of transform coefficients formed by scanning a transform coefficient block according to a given scanning order. A transform coefficient may be "significant" if the transform coefficient is non-zero.

In addition, the video encoder may generate a coordinate indicator for the transform coefficient block. The coordinate indicator may specify the coordinates of a given transform coefficient in the transform coefficient block. The given transform coefficient occurs at the given ordinal position according to an assumed scanning order. In other words, if the transform coefficients of the transform coefficient block were sequenced according to the assumed scanning order, the given transform coefficient would occur at the given ordinal position (and have the coordinates indicated by the coordinate indicator). For example, if the last significant transform coefficient occurs at the n'th position according to the coding scanning order, the given transform coefficient occurs at the n'th position according to the assumed scanning order. The video encoder may then perform an entropy encoding operation on the coordinate indicator derived using the assumed scanning order to generate an entropy encoded version of the coordinate indicator. The video encoder may output the entropy encoded version of the coordinate indicator.

A video decoder may receive the coordinate indicator and convert the coordinate indicator into a scan-based LSC indicator. The scan-based LSC indicator may indicate the given ordinal position. For example, if the transform coefficient at the coordinates indicated by the coordinate indicator occurs at the n'th position according to the assumed scanning order, the scan-based LSC indicator may indicate the n'th position. After converting the coordinate indicator into the scan-based LSC indicator, the video decoder may determine the coding scanning order. In some examples, the video decoder uses the scan-based LSC indicator and the coding scanning order to determine the coordinates of the LSC. The video decoder may use the coordinates of the LSC to select a context model for use in entropy decoding a significance map of the transform coefficient block. The video decoder may also perform entropy decoding operations on level information of the transform coefficient block. The level information of the transform coefficient block may indicate the magnitudes and signs of significant transform coefficients of the transform coefficient block. Subsequently, the video decoder may reconstruct the transform coefficient block based on the significance map and the level information.

In some previous proposals, a video encoder would identify a LSC of a transform coefficient block according to the coding scanning order and generate a coordinate indicator that indicated the coordinates of the identified LSC. In such proposals, a video decoder may need to determine the coding scanning order prior to converting the coordinate indicator into a scan-based LSC indicator. To determine the coding scanning order, the video decoder may need to extract various data (e.g., syntax elements) from the bitstream. For instance, the video decoder may need to extract an intra-prediction mode syntax element or a scanning order indicator from the bitstream. As a result, the video decoder may be forced to wait to convert the coordinate indicator until after such syntax elements are extracted from the bitstream. This may slow the parsing process for the transform coefficient block, and ultimately may slow the operation of video decoder 30.

FIG. 1 is a block diagram that illustrates an example video coding system 10 that may utilize the techniques of this disclosure. In this disclosure, the term "video coding" may refer to video encoding and video decoding. As shown in FIG. 1, video coding system 10 may include a source device 12 and a destination device 14. Source device 12 generates encoded video data. Destination device 14 may decode the encoded video data. Source device 12 and destination device 14 may comprise any of a wide range of devices, including desktop computers, notebook (e.g., laptop) computers, tablet computers, set-top boxes, mobile telephones, telephone handsets, "smart" pads, televisions, cameras, display devices, digital media players, video gaming consoles, video streaming devices, in-vehicle computers, or types of computing devices capable of encoding and/or decoding video data.

Destination device 14 may receive encoded video data via a channel 16. Channel 16 may comprise a medium from which destination device 14 may receive the encoded video data. In one example, channel 16 may comprise a communication medium that enables source device 12 to transmit encoded video data directly to destination device 14 in real-time. Source device 12 or another device may modulate the encoded video data according to a communication standard, such as a wireless communication protocol. The communication medium may comprise a wireless or wired communication medium, such as a radio frequency (RF) spectrum or one or more physical transmission lines. Channel 16 may form part of a packet-based network, such as a local area network, a wide-area network, or a global network such as the Internet. Channel 16 may include routers, switches, base stations, or any other equipment that may be useful to facilitate communication of the encoded video data from source device 12 to destination device 14.

In some examples, source device 12 and destination device 14 may be equipped for wireless communication. However, the techniques of this disclosure are not necessarily limited to wireless applications or settings. Rather, the techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, source device 12 and destination device 14 may be configured to support one-way or two-way video transmission to support applications such as video streaming, video playback, video broadcasting, and/or video telephony.

Furthermore, in some examples, source device 12 may output the encoded video data to a storage system 34. Similarly, destination device 14 may access encoded video data stored on storage system 34. In various examples, storage system 34 may include various distributed or locally accessed data storage media. Example types of data storage media include, but are not limited, to hard drives, Blu-ray discs, DVDs, CD-ROMs, solid state memory units, volatile or non-volatile memory, or other digital storage media suitable for storing encoded video data.

In some examples, storage system 34 may comprise a file server or another intermediate storage device that may hold the encoded video generated by source device 12. Destination device 14 may access stored video data from storage system 34 via streaming or download. The file server may be a server capable of storing encoded video data and transmitting the encoded video data to destination device 14. Example file servers include web servers (e.g., for websites), FTP servers, network attached storage (NAS) devices, or local disk drives. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage system 34 may be a streaming transmission, a download transmission, or a combination of both.

In the example of FIG. 1, source device 12 includes a video source 18, a video encoder 20 and an output interface 22. In some examples, output interface 22 may include a modulator/demodulator (modem) and/or a transmitter. Video source 18 may provide video data to video encoder 20. In various examples, video source 18 may comprise various types of devices and/or systems for providing video data. For example, video source 18 may comprise a video capture device, such as a video camera. In another example, video source 18 may comprise a video archive that contains previously captured video. In yet another example, video source 18 may comprise a video feed interface that receives video from a video content provider. In yet another example, video source 18 may comprise a computer graphics system for generating computer graphics data.

As described in detail below, video encoder 20 may encode the video data provided by video source 18. In some examples, source device 12 may transmit the encoded video data directly to destination device 14 via output interface 22. Moreover, in some examples, storage system 34 may store the encoded video data for later access by destination device 14 or other devices.

This disclosure may generally refer to video encoder 20 as "signaling" certain information to another device, such as a video decoder. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage system 34) prior to being received and decoded by a video decoder. Thus, the term "signaling" may generally refer to the communication of syntax or other data used to decode the compressed video data. Such communication may occur in real- or near-real-time. Alternately, such communication may occur over a span of time, such as might occur when storing syntax elements to a medium at the time of encoding, which a video decode may then retrieve at any time after being stored to this medium.

In the example of FIG. 1, destination device 14 includes an input interface 28, a video decoder 30, and a display device 32. In some examples, input interface 28 may include a receiver and/or a modem. Input interface 28 of destination device 14 receives encoded video data from channel 16 and/or storage system 34. Video decoder 30 decodes the encoded video data received by input interface 28. Destination device 14 may render the decoded video data for display on display device 32.

Display device 32 may be integrated with or may be external to destination device 14. In some examples, destination device 14 may include an integrated display device and may also be configured to interface with an external display device. In various examples, display device 32 may comprise various types of display devices. For example, display device 32 may comprise a liquid crystal display (LCD), a plasma display, an organic light emitting diode (OLED) display, or another type of display device.

Although not shown in FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented using various types of circuitry, such as one or more microprocessors, digital signal processors (DSPs), application specific integrated circuits (ASICs), field programmable gate arrays (FPGAs), discrete logic, hardware, or any combinations thereof. In some instances, video encoder 20 and video decoder 30 may be implemented at least partially using software. When the techniques are implemented partially in software, a device may store instructions for the software in a suitable, non-transitory computer-readable medium and use one or more processors to execute the instructions in hardware in order to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 may operate according to a video compression standard, such as the High Efficiency Video Coding (HEVC) standard presently under development and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Example extensions to standards include the scalable video coding (SVC) and Multiview Video Coding (MVC) extensions to the H.264/AVC standard. The techniques of this disclosure are not limited to any particular coding standard. Other examples of video compression standards include MPEG-2 and ITU-T H.263.

As mentioned briefly above, video encoder 20 encodes video data. The video data may comprise one or more pictures. Each of the pictures is a still image. In some instances, a picture may be referred to as a "frame." When video encoder 20 encodes the video data, video encoder 20 may generate a bitstream. The bitstream may include a sequence of bits that form a representation of coded pictures and associated data. A coded picture is a coded representation of a picture.

To generate the bitstream, video encoder 20 may perform an encoding operation on the video data. When video encoder 20 performs the encoding operation on the video data, video encoder 20 may generate a series of coded pictures and associated data. The associated data may include sequence parameter sets, picture parameter sets, and adaptation parameter sets. A sequence parameter set may contain parameters applicable to zero or more sequences of pictures. A picture parameter set may contain parameters applicable to zero or more pictures. An adaptation parameter set (APS) may also contain parameters applicable to zero or more pictures, but such parameters may change more frequently than the parameters of a picture parameter set.

To generate a coded picture, video encoder 20 may partition a picture into one or more equally-sized non-overlapping video blocks. Each of the video blocks may be associated with a treeblock. A video block may be a two-dimensional (2D) block of video data (e.g., pixels). In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs).

In some examples, video encoder 20 may partition a picture into a plurality of slices. Each of the slices may include an integer number of CUs. In some instances, a slice comprises an integer number of treeblocks. In other instances, a boundary of a slice may be within a treeblock. If the boundary of a slice is within a treeblock, the slice may be referred to as a fine granular slice. In some examples, video encoder 20 may encode slices according to the size in bytes of the slices or according to the number of treeblocks in the slices.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice." The coded slice may include a slice header and slice data. The slice data may include a series of successive coded CUs in coding order. The slice header may contain data elements pertaining to the first or all treeblocks of the slice.

To generate a coded slice, video encoder 20 may perform encoding operations on each treeblock in the slice. When video encoder 20 performs an encoding operation on a treeblock, video encoder 20 may generate a coded treeblock. The coded treeblock may comprise data representing an encoded version of the treeblock.

To generate a coded treeblock, video encoder 20 may recursively perform quadtree partitioning on the video block of a treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. One or more syntax elements in the bitstream may indicate a maximum number of times video encoder 20 may partition a video block of a treeblock. The syntax elements may also indicate a smallest coding unit (SCU). A video block of a CU may be square in shape.

Video encoder 20 may perform encoding operations on each non-partitioned CU in a treeblock. A non-partitioned CU may be a CU whose video block is not partitioned into video blocks associated with other CUs. As part of performing an encoding operation on a non-partitioned CU, video encoder 20 may generate one or more prediction units (PUs) for the CU. Each of the PUs of the CU may be associated with a different video block within the video block of the CU.

Video encoder 20 may use intra prediction or inter prediction to generate prediction data for the PUs of the CU. When video encoder 20 uses intra prediction to generate the prediction data for a PU, video encoder 20 may derive the prediction data for the PU from decoded samples of the picture that contains the PU. When video encoder 20 uses inter prediction to generate the prediction data for the PU, video encoder 20 may derive the prediction data for the PU from decoded samples of pictures other than the picture that contains the PU. The prediction data for a PU may include a predicted video block and various syntax elements.

After video encoder 20 generates prediction data for each PU of a CU, video encoder 20 may generate residual data for the CU. The residual data for the CU may indicate differences between samples in the predicted video blocks for the PUs of the CU and the samples in the original video block of the CU.

Figure 2:
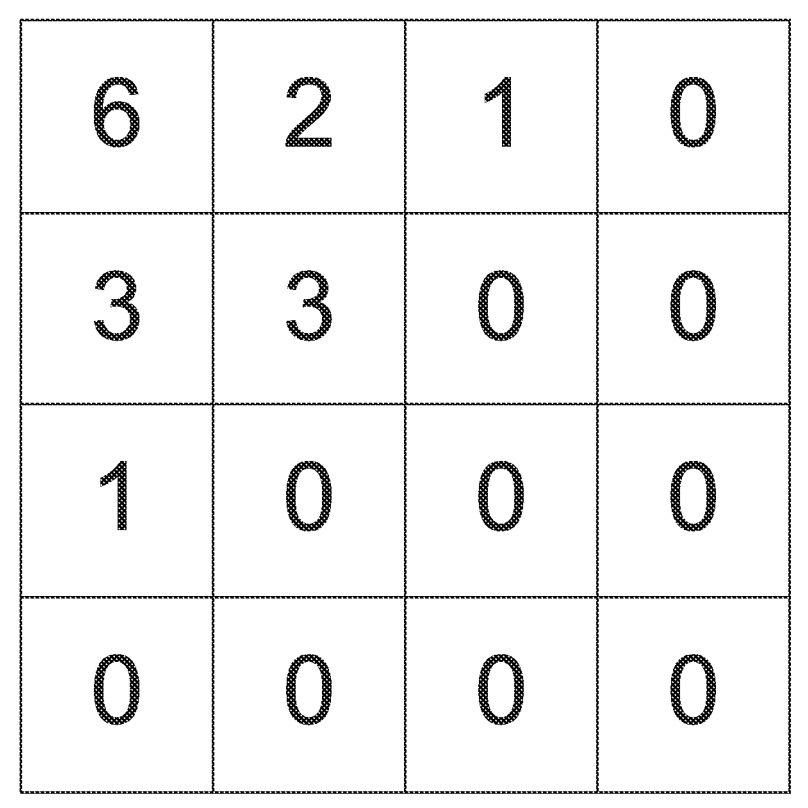

Video encoder 20 may use quadtree partitioning to partition the residual data of a non-partitioned CU into one or more residual video blocks. Each of the residual video blocks may be associated with a different transform unit (TU) of the CU. Video encoder 20 may apply one or more transforms to the residual video blocks associated with the TUs. A transform coefficient block may result from applying the transform to the residual video block associated with the TU. The transform coefficient block may be a 2D matrix of transform coefficients. FIG. 2 is a conceptual diagram that illustrates an example transform coefficient block.

Video encoder 20 may quantize the transform coefficients in a transform coefficient block. Quantization generally refers to a process in which transform coefficients in a transform coefficient block are quantized to possibly reduce the amount of data used to represent the transform coefficients, providing further compression. Quantization may reduce the bit depth associated with some or all of the transform coefficients. For example, an n-bit value may be rounded down to an m-bit value during quantization, where n is greater than m.

After quantizing a transform coefficient block, video encoder 20 may generate a set of syntax elements associated with the transform coefficient block. Video encoder 20 may then perform entropy encoding operations on some of these syntax elements. For example, video encoder 20 may perform a context adaptive variable length coding (CAVLC) operation, a context adaptive binary arithmetic coding (CABAC) operation, a syntax-based context-adaptive binary arithmetic coding (SBAC) operation, a Probability Interval Partitioning Entropy (PIPE) coding operation, or another type of entropy encoding operation on these syntax elements. Video encoder 20 may also perform entropy encoding operations on other syntax elements associated with the video data.

After video encoder 20 generates the syntax elements associated with the transform coefficient block and performs entropy encoding on a transform coefficient block, video encoder 20 may include the resulting data in a bitstream for the video data. The bitstream may include a sequence of bits that forms a representation of coded pictures and associated data. The bitstream may comprise a sequence of network abstraction layer (NAL) units. Each of the NAL units may be a syntax structure containing an indication of a type of data in the NAL unit and bytes containing the data. For example, a NAL unit may contain data representing a sequence parameter set, a picture parameter set, an adaptation parameter set, a coded slice, supplemental enhancement information, an access unit delimiter, filler data, or another type of data. The data of a NAL unit may be in the form of a raw byte sequence payload (RBSP) interspersed with emulation prevention bits. A RBSP may be a syntax structure containing an integer number of bytes that is encapsulated within a NAL unit.

When video encoder 20 performs an entropy encoding operation on a transform coefficient block, video encoder 20 may determine whether there is at least one significant (i.e., non-zero) transform coefficient in the transform coefficient block. If there is at least one significant transform coefficient in the transform coefficient block, video encoder 20 may update a coded block flag (CBF) to indicate that the transform coefficient block includes at least one significant transform coefficient. If there are no significant transform coefficients in the transform coefficient block, video encoder 20 may update the CBF to indicate that the transform coefficient block does not include any significant transform coefficients.

If there is at least one significant transform coefficient in the transform coefficient block, video encoder 20 may identify a last significant coefficient (LSC) of the transform coefficient block. The LSC of the transform coefficient block is the non-zero transform coefficient that occurs last when the transform coefficients of the transform coefficient block are sequenced according to a coding scanning order.

Video encoder 20 may identify the LSC of the transform coefficient block according to various coding scanning orders. For example, video encoder 20 may identify the LSC according to a zigzag scanning order, a horizontal scanning order, a vertical scanning order, a diagonal scanning order, or a sub-block scanning order. Forward scanning orders start at a DC transform coefficient of a transform coefficient block. The DC transform coefficient occurs at a top left corner of the transform coefficient block. Reverse or inverse scanning orders may start at a bottom right corner of a transform coefficient block.

In some examples, if the transform coefficient block is associated with an intra-predicted CU, video encoder 20 may select the scanning order based on an intra-prediction mode associated with the CU. Furthermore, in some examples, video encoder 20 may adaptively switch between scanning orders to optimize coding efficiency and/or subjective picture quality.

Figure 3:
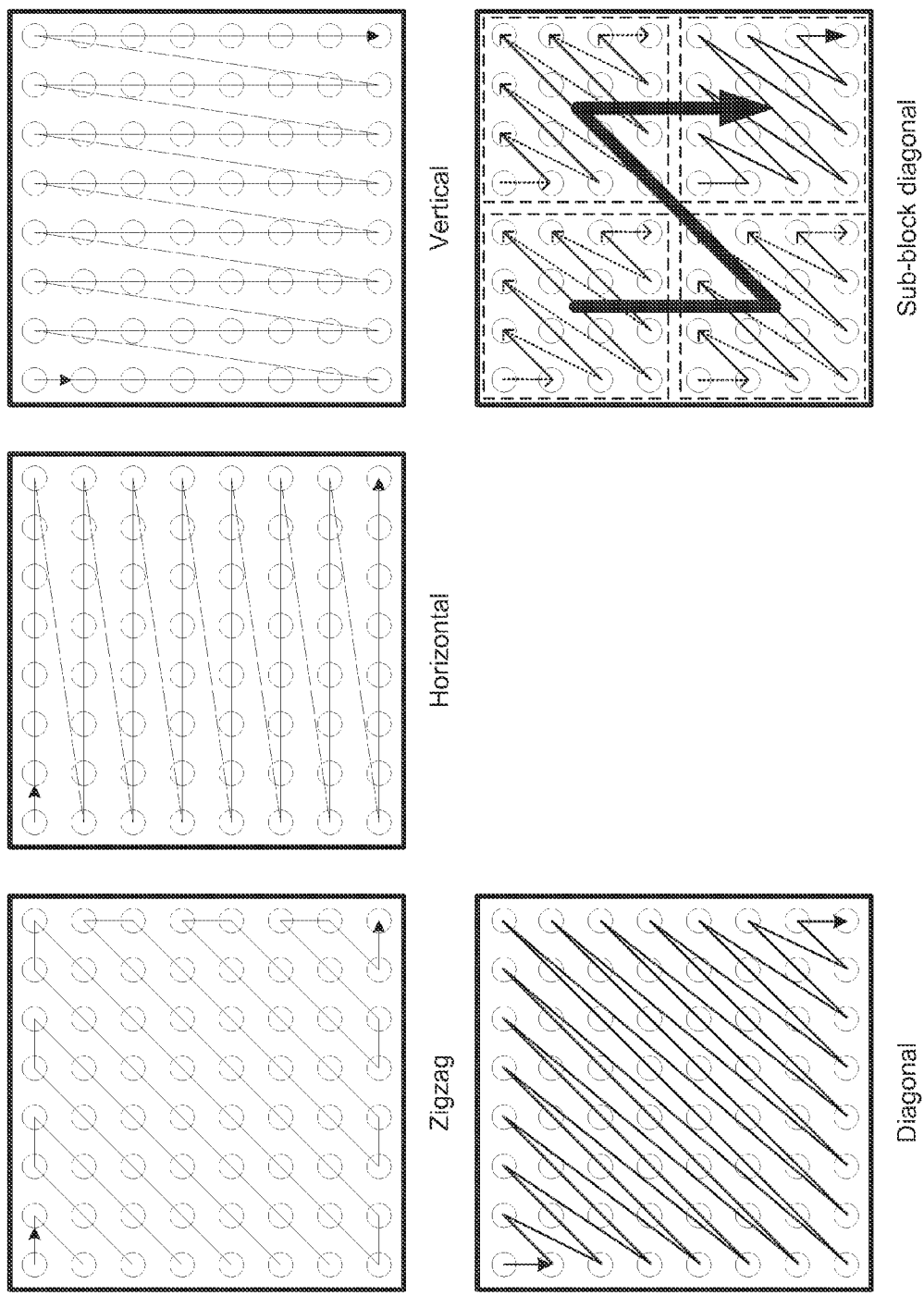
FIG. 3 is a conceptual diagram that illustrates example zigzag, horizontal, vertical, reverse diagonal, and sub-block scanning orders for an 8×8 transform coefficient block.

FIG. 3 is a conceptual diagram that illustrates example scanning orders. Part (a) of FIG. 3 shows an example zigzag scanning order. Part (b) of FIG. 3 shows an example horizontal scanning order. Part (c) of FIG. 3 shows an example a vertical scanning order. Part (d) of FIG. 3 shows an example reverse diagonal scanning order.

Part (e) of FIG. 3 shows an example diagonal sub-block scanning order. In a sub-block scanning order, video encoder 20 may split a large transform coefficient block into sub-blocks. Video encoder 20 may then process each of the transform coefficients within a first sub-block before processing each of the transform coefficients in a second sub-block, and so on. In the example of FIG. 3, video encoder 20 has partitioned the transform coefficient block into four 4×4 sub-blocks. In other examples, video encoder 20 may partition a transform coefficient block into sub-blocks having other sizes. In FIG. 3, the sub-blocks are shown as dashed-line squares. For each of the sub-blocks, video encoder 20 may process the transform coefficients of the sub-block in a particular order. In the example of FIG. 3, video encoder 20 processes the transform coefficients in a upper-left sub-block in an up/right diagonal order, then processes the transform coefficients in a lower-left sub-block in the up/right diagonal order, then processes the transform coefficients in the upper-right sub-block in the up/right diagonal order, and finally processes the transform coefficients in the lower-right sub-block in the up/right diagonal order.

In other examples, video encoder 20 may partition the transform coefficient block into 4×4 sub-blocks (or other sub-block sizes). In such examples, video encoder 20 may process each of the 4×4 sub-blocks according to the coding scanning order.

After identifying the LSC, video encoder 20 may determine an ordinal position of the LSC. The ordinal position of the LSC may indicate a position of the LSC in a 1D vector that results from sequencing the significant and non-significant transform coefficients of the transform coefficient block according to the coding scanning order. For instance, video encoder 20 may determine that the LSC occurs at the n'th position in a 1D vector that results from sequencing the transform coefficients of the transform coefficient block according to the coding scanning order. In other words, if the transform coefficients of the transform coefficient block were sequenced according to the coding scanning order, video decoder 20 may determine that the LSC is the n'th transform coefficient. In this example, n may be an integer, such as 5 or 10.

Furthermore, video encoder 20 may identify a substitute coefficient (i.e., a given transform coefficient in the transform coefficient block). The substitute coefficient may be a transform coefficient that occurs at the ordinal position of the LSC when the transform coefficients are sequenced according to an assumed scanning order. For example, if the LSC occurs at the $10^{th}$ position when the transform coefficients are sequenced according to the coding scanning order, the substitute coefficient occurs at the $10^{th}$ position when the transform coefficients are sequenced according to the assumed scanning order.

After identifying the substitute coefficient, video encoder 20 may generate a coordinate indicator for the substitute coefficient. The coordinate indicator for the substitute coefficient specifies the coordinates within the transform coefficient block of the substitute coefficient. Video encoder 20 may signal the coordinate indicator for the substitute coefficient instead of a coordinate indicator for the LSC, hence the name "substitute coefficient."

The substitute coefficient may not actually be a significant transform coefficient or the last significant transform coefficient according to the assumed scanning order. However, because the substitute coefficient and the LSC occur at the same ordinal positions according to the assumed and coding scanning orders, video encoder 20 may use the coordinate indicator of the substitute coefficient to signal the ordinal position of the LSC. Because the substitute coefficient and the LSC occur at the same ordinal positions according to the assumed and coding scanning orders, video decoder 30 may be able to determine the ordinal position of the LSC based on coordinate of the substitute coefficient without first determining the coding scanning order.

In some instances, the coding scanning order is the same as the assumed scanning order. In other instances, the coding scanning order is different than the assumed scanning order. For example, the coding scanning order may be a horizontal scanning order and the assumed scanning order may be a diagonal scanning order. In this example, if the transform coefficient block is 8×8 and the LSC occurs at the $10^{th}$ position according to the horizontal (coding) scanning order, video encoder 20 may generate a coordinate indicator specifying coordinates (0, 3). In this example, the coordinate indicator specifies coordinates (0, 3) because the transform coefficient at coordinates (0, 3) (i.e., the substitute coefficient) occurs at the $10^{th}$ position according to the diagonal (assumed) scanning order. In other examples, the assumed scanning order may be a sub-block scanning order and the coding scanning order may be selected from among a horizontal scanning order, a vertical scanning order, a diagonal scanning order, a zigzag scanning order, and the sub-block scanning order. In some instances, the assumed scanning order starts at a top left corner of the transform coefficient block. In other instances, the assumed scanning order starts at a lower right corner of the transform coefficient block.

Because the coding and assumed scanning orders may be different, the coordinates of the LSC may or may not be the same as the coordinates of the substitute coefficient. Hence, the coordinates of the LSC may not be the same as the coordinates indicated by the coordinate indicator. For example, the coding scanning order may be the horizontal scanning order, the assumed scanning order may be the vertical scanning order, and the transform coefficient block is 8×8. In this example, when the transform coefficient block is scanned according to the coding scanning order, the LSC may be at coordinates (0, 4). Hence, the LSC may be at the fifth position according to the coding scanning order. In this example, the transform coefficient at coordinates (4, 0) is at the fifth position according to the assumed scanning order. Hence, in this example, the coordinate indicator specifies the coordinates (4, 0), not the coordinates (0, 4).

Video encoder 20 may perform a CABAC encoding operation on the coordinate indicator. In some instances, performing the CABAC encoding operation on the coordinate indicator may be more efficient than performing the CABAC encoding operation on a corresponding scan-based LSC indicator because the entropy encoding operation may be able to exploit statistical relationships between the x-coordinate and the y-coordinate of the coordinate indicator. The scan-based LSC indicator may indicate an ordinal position of a last significant transform coefficient according to a scanning order. Video encoder 20 may add the CABAC encoded version of the coordinate indicator to the encoded bitstream.

Figure 4:
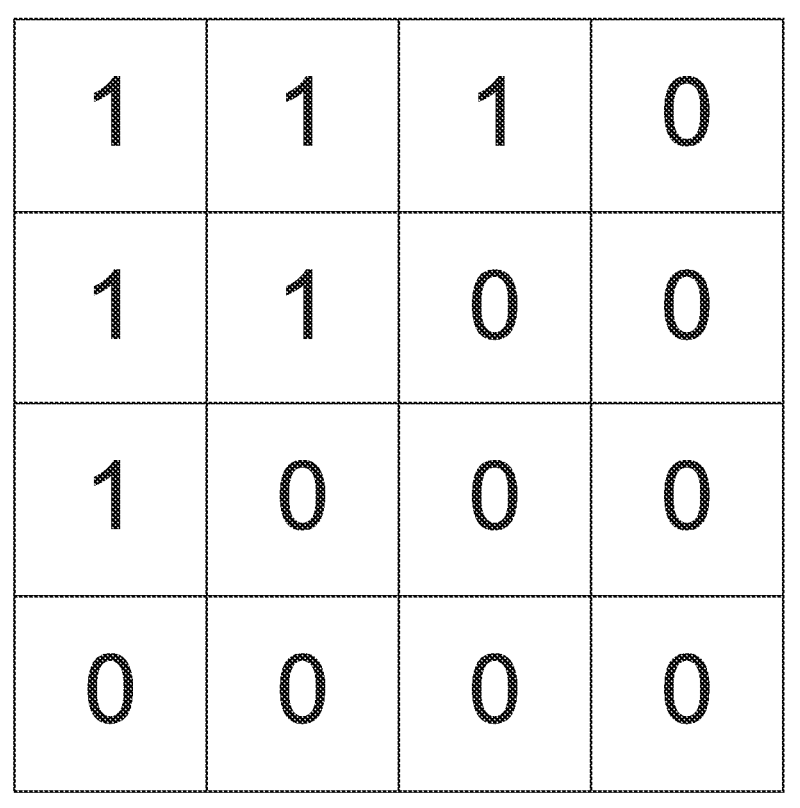

In addition, video encoder 20 may generate a significance map and level information for the transform coefficient block. The significance map may indicate which ones of the transform coefficients in the transform coefficient block are significant. FIG. 4 is a conceptual diagram that illustrates a 2D representation of an example significance map for the transform coefficient block of FIG. 2. The level information for the transform coefficient block may indicate the magnitudes and positive/negative signs of significant transform coefficients in the transform coefficient block.

To generate the level information, video encoder 20 may sequence the magnitudes (i.e., absolute values) of the significant transform coefficients and the positive/negative signs of the significant transform coefficients according to the coding scanning order. Video encoder 20 may perform entropy encoding operations on the coordinate indicator, the significance map, and the level information. Video encoder 20 may include the entropy encoded versions of the coordinate indicator, the significance map, and the level information in the bitstream. In this way, video encoder 20 may output entropy encoded versions of the coordinate indicator, the significance map, and the level information of the transform coefficient block.

Video encoder 20 may perform one or more coding passes on the transform coefficient block to generate and entropy encode the significance map and the level information of the transform coefficient block. In each of the coding passes, video encoder 20 may scan through the transform coefficients of the transform coefficient block according to a reverse scanning order. The reverse scanning order may be a reverse of the scanning order used to identify the LSC. For example, if video encoder 20 identified the LSC according to a forward diagonal scanning order, the reverse scanning order may be a reverse diagonal scanning order.

For each transform coefficient processed during a first coding pass, video encoder 20 may determine whether the ordinal position of the transform coefficient occurs before the ordinal position of the LSC. If the ordinal position of the transform coefficient occurs before the ordinal position of the LSC, video encoder 20 may generate and CABAC encode a syntax element (i.e., a significance flag) that indicates whether the transform coefficient is significant. If the transform coefficient does not occur before the ordinal position of the LSC, video encoder 20 does not generate or CABAC encode a significance flag for the transform coefficient. In this way, video encoder 20 may generate and CABAC encode a significance map for the transform coefficient block. After generating and CABAC encoding the significance map, video encoder 20 may include the CABAC encoded version of the significance map in the bitstream.

In some instances, there may be statistical relationships between the position of the LSC and the content of the significance map. Accordingly, video encoder 20 may use the position of the LSC to select one or more context models for use in CABAC encoding the significance flags of the significance map.

For each transform coefficient processed during a second coding pass, video encoder 20 may determine whether the transform coefficient is significant. If the transform coefficient is significant, video encoder 20 may generate and CABAC encode a syntax element (i.e., a level-greater-than-one flag) that indicates whether the absolute value of the transform coefficient is greater than one. If the transform coefficient is not significant, video encoder 20 does not generate or CABAC encode a level-greater-than-one flag for the transform coefficient. After generating and CABAC encoding the level-greater-than-one flags, video encoder 20 may include the CABAC encoded versions of the level-greater-than-one flags in the bitstream.

During a third coding pass, video encoder 20 may generate and CABAC encode syntax elements indicating whether the absolute values of the transform coefficients are greater than two (i.e., level-greater-than-two flags). After generating and CABAC encoding the level-greater-than-two flags, video encoder 20 may include the CABAC encoded versions of the level-greater-than-two flags in the bitstream.

For each transform coefficient processed during a fourth coding pass, video encoder 20 may determine whether the transform coefficient is significant. If the transform coefficient is significant, video encoder 20 may generate a syntax element (i.e., a sign flag) that indicates whether the transform coefficient is positive or negative. If the transform coefficient is not significant, video encoder 20 does not generate a sign flag for the transform coefficient. After generating the sign flags, video encoder 20 may include the sign flags in the bitstream.

For each transform coefficient processed during a fifth coding pass, video encoder 20 may determine whether the transform coefficient is significant. If the transform coefficient is significant, video encoder 20 may generate a remainder value for the coefficient (i.e., level-remainder elements). Video encoder 20 may then identify a Golomb-Rice code that corresponds to the remainder value. After identifying the Golomb-Rice code for the transform coefficient, video encoder 20 may include the Golomb-Rice code in the bitstream. If the transform coefficient is not significant, video encoder 20 does not generate a level-remainder element for the transform coefficient.

When video decoder 30 receives a bitstream, video decoder 30 may perform a parsing operation on the bitstream. The parsing operation extracts syntax elements from the bitstream. Video decoder 30 may perform a reconstruction operation that reconstructs video blocks of the video data based on the syntax elements extracted from the bitstream. In some instances, video decoder 30 may perform the parsing operation and the reconstruction operation in parallel.

As part of performing the parsing operation, video decoder 30 may perform entropy decoding operations on various entropy encoded syntax elements in the bitstream. For example, video decoder 30 may perform entropy decoding operations on entropy encoded coordinate indicators, significance maps, level information for transform coefficient blocks, and other syntax elements in the bitstream. The other syntax elements may include intra-mode parameters, motion information, and so on. The intra-mode parameters indicate intra-prediction modes.

After video decoder 30 entropy decodes a coordinate indicator for a transform coefficient block, video decoder 30 may convert the coordinate indicator into a scan-based LSC indicator. If the transform coefficients were sequenced into a 1D vector according to the assumed scanning order, the scan-based LSC indicator indicates the position in the 1D vector of the transform coefficient at the coordinates indicated by the coordinate indicator. For example, the assumed scanning order may be the vertical scanning order and the coordinate indicator may specify coordinates (4, 0). In this example, video decoder 30 may convert the coordinate indicator into a scan-based LSC indicator that indicates the number five.

The scan-based LSC indicator indicates an ordinal position of both the LSC and the substitute coefficient. The coordinate indicator may indicate that the coordinates of the substitute coefficient occur at the n'th ordinal position according to the assumed scanning order. Because the substitute coefficient occurs at the n'th position according to the assumed scanning order and the LSC occurs at the n'th position according to the coding scanning order, the scan-based LSC indicator indicates the n'th position regardless of whether the assumed scanning order differs from the coding scanning order.

For example, the transform coefficient block may be 8×8, the assumed scanning order may be the diagonal scanning order, and the coordinate indicator may specify the coordinates (0, 3). In this example, a transform coefficient at coordinates (0, 3) may be at the $10^{th}$ position according to the diagonal scanning order. Hence, in this example, video decoder 30 may generate a scan-based LSC indicator that indicates the $10^{th}$ position. Because of how video encoder 20 generates the coordinate indicator, the LSC also occurs at the $10^{th}$ position according to the coding scanning order.

After converting the coordinate indicator into the scan-based LSC indicator, video decoder 30 may determine the coding scanning order. After determining the coding scanning order, video decoder 30 may determine the coordinates of the LSC based on the coding scanning order and the scan-based LSC indicator. Video decoder 30 may then entropy decode the significance map and level information of the transform coefficient block based on the coordinates of the LSC and/or the scan-based LSC indicator. For instance, video decoder 30 may CABAC decode the significance map using one or more CABAC contexts selected based on the coordinates of the LSC and/or the scan-based LSC indicator. Subsequently, video decoder 30 may use the coding scanning order to reconstruct the transform coefficient block based on the significance map and the level information for the transform coefficient block.

In accordance with the techniques of this disclosure, video encoder 20 may perform a method for encoding video data. The method may comprise determining that a last significant transform coefficient of a transform coefficient block occurs at a given ordinal position according to a coding scanning order. The method may also comprise generating a coordinate indicator that specifies coordinates of a given transform coefficient in the transform coefficient block. The given transform coefficient may occur at the given ordinal position according to an assumed scanning order. In addition, the method may comprise performing an entropy coding operation on the coordinate indicator to generate an entropy encoded version of the coordinate indicator. The method also comprises outputting the entropy encoded version of the coordinate indicator. The techniques of this disclosure may enable video decoder 30 to convert the coordinate indicator to a correct scan-based LSC indicator without extracting data needed to determine the coding scanning order. For instance, video decoder 30 may assume that video encoder 20 used the assumed scanning order to generate the coordinate indicator. In addition, video decoder 30 may assume that the transform coefficient at the position indicated by the coordinate indicator has the same ordinal position according to the coding and assumed scanning orders. In some examples, the assumed scanning order may be preconfigured at video decoder 30. In other examples, video encoder 20 may signal the assumed scanning order to video decoder 30.

Hence, video decoder 30 may generate a scan-based LSC indicator that indicates the correct ordinal position of the LSC regardless of the actual coding scanning order. Because the scan-based LSC indicator indicates the correct ordinal position regardless of the actual coding scanning order, video decoder 30 may not need to extract the data needed to determine the actual coding scanning order in order to determine the scan-based LSC indicator. Hence, video decoder 30 may be able to generate the scan-based LSC indicator without waiting to extract the data from which video decoder 30 determines the coding scanning order. This may increase the throughput of the decoding process.

In this way, video decoder 30 may perform a method for decoding video data. This method may comprise receiving a coordinate indicator that specifies coordinates of a given position in a transform coefficient block. The given position may occur at a given ordinal position according to an assumed scanning order. A last significant transform coefficient of the transform coefficient block occurs at the given ordinal position according to a coding scanning order. The transform coefficient block may comprise transform coefficients associated with the video data. The method may also comprise converting the coordinate indicator into a scan-based LSC indicator that specifies the given ordinal position.

Figure 5:
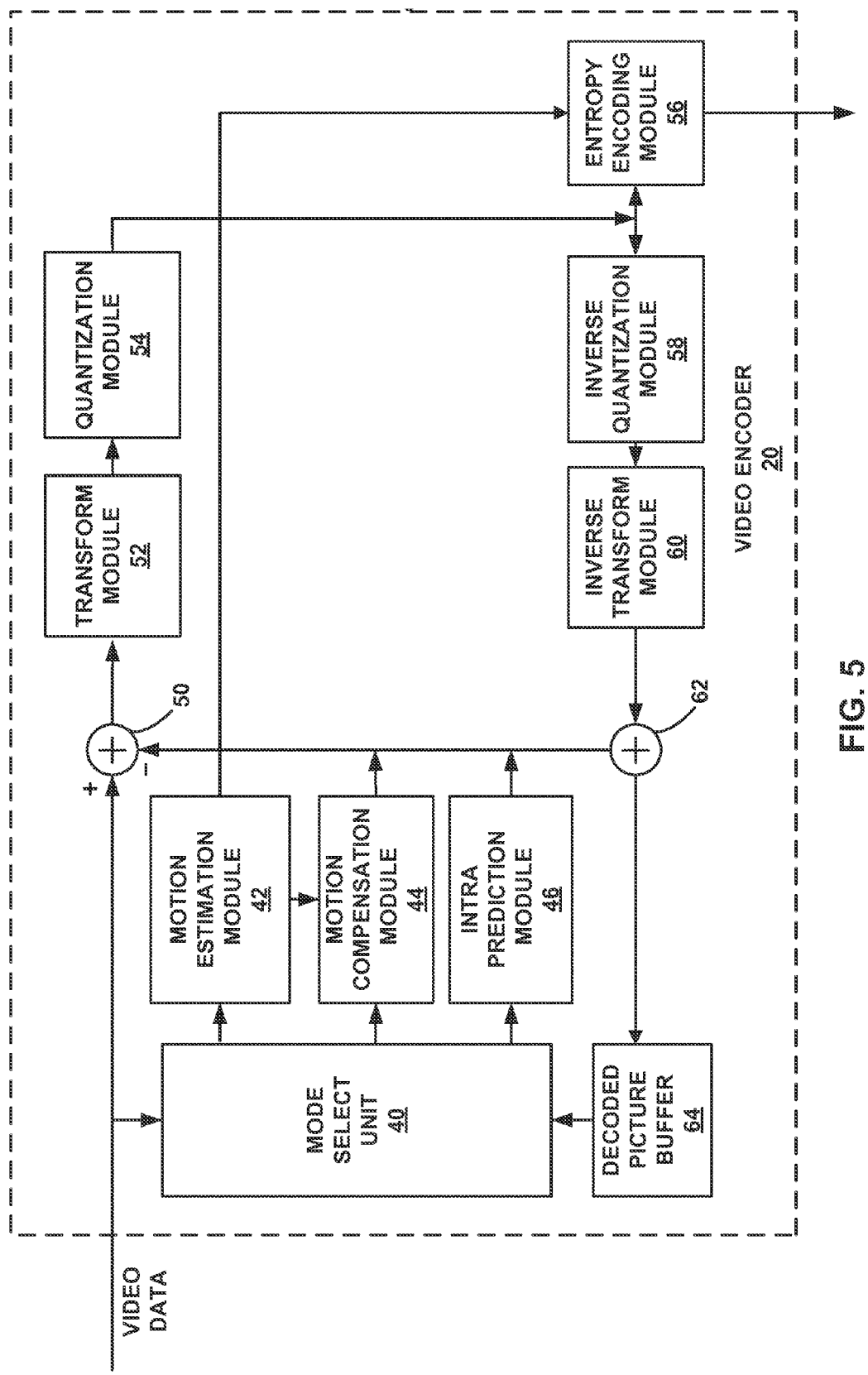
FIG. 5 is a block diagram that illustrates an example video encoder configured to implement the techniques of this disclosure.

FIG. 5 is a block diagram that illustrates an example video encoder 20 that is configured to implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 5, video encoder 20 includes a plurality of functional components. The functional components of video encoder 20 include a mode select module 40, a motion estimation module 42, a motion compensation module 44, an intra-prediction module 46, a residual generation module 50, a transform module 52, a quantization module 54, an entropy encoding module 56, an inverse quantization module 58, an inverse transform module 60, a reconstruction module 62, and a decoded picture buffer 64. In other examples, video encoder 20 may include more, fewer, or different functional components. For example, video encoder 20 may include a deblocking filter module to filter the output of reconstruction module 62 to remove blockiness artifacts. Furthermore, motion estimation module 42 and motion compensation module 44 may be highly integrated, but are represented in the example of FIG. 5 separately for purposes of explanation.

Video encoder 20 may receive video data. Video encoder 20 may receive the video data from various sources. For example, video encoder 20 may receive the video data from video source 18 (FIG. 1) or another source. The video data may represent sequences of pictures. To encode the video data, video encoder 20 may perform an encoding operation on pictures in the video data. As part of performing an encoding operation on a picture, video encoder 20 may perform encoding operations on each slice in the picture. As part of performing an encoding operation on a slice, video encoder 20 may perform an encoding operation on each treeblock in the slice.

As part of performing an encoding operation on a treeblock, video encoder 20 may partition the video block of the treeblock into one or more video blocks. Each of the video blocks may be associated with a different CU. In some examples, the sizes of the video blocks of the CUs may range from 8×8 pixels up to the size of the video block of the treeblock with a maximum of 64×64 pixels or greater. In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has sixteen pixels in a vertical direction (y=16) and sixteen pixels in a horizontal direction (x=16). Likewise, an N×N block generally has N pixels in a vertical direction and N pixels in a horizontal direction, where N represents a non-negative integer value. Similar notation may be used to indicate dimensions of transform coefficient blocks.

As part of performing the encoding operation on a treeblock, video encoder 20 may generate a hierarchical quadtree data structure for the treeblock. For example, a treeblock may correspond to a root node of the quadtree data structure. If video encoder 20 partitions the video block of the treeblock into four sub-blocks, the root node has four child nodes in the quadtree data structure. The child nodes correspond to the CUs associated with the sub-blocks. If video encoder 20 partitions one of the sub-blocks into four sub-sub-blocks, the node corresponding to the CU associated with the sub-block may have four child nodes, which correspond to the CUs associated with the sub-sub-blocks.

Each node of the quadtree data structure may contain syntax elements associated with the corresponding CU. For example, a node in the quadtree may include a split flag, indicating whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A leaf node in the quadtree data structure may be referred to as a "coding node." The data representing the encoded version of the treeblock may include data based on the quadtree data structure for the treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, mode select module 40 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, mode select module 40 may perform geometric partitioning to partition the video block of a CU among PUs of the CU along a boundary that does not meet the sides of the video block of the CU at right angles.

Motion estimation module 42 and motion compensation module 44 may perform inter prediction on each PU of the CU. Inter prediction may provide temporal compression. By performing inter prediction on a PU, motion estimation module 42 and motion compensation module 44 may generate prediction data for the PU based on decoded samples of reference pictures other than the picture that contains the CU. The prediction data for the PU may include a predicted video block and various syntax elements.

Furthermore, when motion estimation module 42 performs a motion estimation operation with regard to a PU, motion estimation module 42 may generate one or more motion vectors for the PU. For instance, slices may be I slices, P slices, or B slices. Motion estimation module 42 and motion compensation module 44 may perform different operations for a PU of a CU depending on whether the PU is in an I slice, a P slice, or a B slice. In an I slice, all PUs are intra predicted. Hence, if the PU is in an I slice, motion estimation module 42 and motion compensation module 44 do not perform inter prediction on the PU.

If the PU is in a P slice, the picture containing the PU is associated with a list of reference pictures referred to as "list 0." Each of the reference pictures in list 0 contains samples that may be used for inter prediction of subsequent pictures in decoding order. When motion estimation module 42 performs the motion estimation operation with regard to a PU in a P slice, motion estimation module 42 may search the reference pictures in list 0 for a reference block for the PU. The reference block of the PU may be a set of samples, e.g., a block of samples, that most closely corresponds to the samples in the video block of the PU. Motion estimation module 42 may use a variety of metrics to determine how closely a set of samples in a reference picture corresponds to the samples in the video block of a PU. For example, motion estimation module 42 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 42 may generate a reference index that indicates the reference picture in list 0 containing the reference block and a motion vector that indicates a spatial displacement between the PU and the reference block. In various examples, motion estimation module 42 may generate motion vectors to varying degrees of precision. For example, motion estimation module 42 may generate motion vectors at one-quarter sample precision, one-eighth sample precision, or other fractional sample precision. In the case of fractional sample precision, reference block values may be interpolated from integer-position samples in the reference picture. Motion estimation module 42 may output motion information for the PU to entropy encoding module 56 and motion compensation module 44. The motion information for the PU may include the reference index and the motion vector of the PU. Motion compensation module 44 may use the motion information of a PU to identify and retrieve the reference block of the PU.

If the PU is in a B slice, the picture containing the PU may be associated with two lists of reference pictures, referred to as "list 0" and "list 1." Each of the reference pictures in list 0 and list 1 contain samples that may be used for inter prediction of subsequent pictures in decoding order. In some examples, a picture containing a B slice may be associated with a list combination that is a combination of list 0 and list 1.

Furthermore, if the PU is in a B slice, motion estimation module 42 may perform uni-directional prediction or bi-directional prediction for the PU. When motion estimation module 42 performs uni-directional prediction for the PU, motion estimation module 42 may search the reference pictures of list 0 or list 1 for a reference block for the PU. Motion estimation module 42 may then generate a reference index that indicates the reference picture in list 0 or list 1 that contains the reference block and a motion vector that indicates a spatial displacement between the PU and the reference block. Motion estimation module 42 may output motion information for the PU to entropy encoding module 56 and motion compensation module 44. The motion information for the PU may include the reference index, a prediction direction indicator, and the motion vector of the PU. The prediction direction indicator may indicate whether the reference index indicates a reference picture in list 0 or list 1. Motion compensation module 44 may use the motion information of the PU to identify and retrieve the reference blocks of the PU.

When motion estimation module 42 performs bi-directional prediction for a PU, motion estimation module 42 may search the reference pictures in list 0 for a reference block for the PU and may also search the reference pictures in list 1 for another reference block for the PU. Motion estimation module 42 may then generate reference indexes that indicate the reference pictures in list 0 and list 1 containing the reference blocks and motion vectors that indicate spatial displacements between the reference blocks and the PU. Motion estimation module 42 may output motion information of the PU to entropy encoding module 56 and motion compensation module 44. The motion information for the PU may include the reference indexes and the motion vectors of the PU. Motion compensation module 44 may use the motion information to identify and retrieve the reference block of the PU.

As part of performing an encoding operation on a CU, intra prediction module 46 may perform intra prediction on PUs of the CU. Intra prediction may provide spatial compression. When intra prediction module 46 performs intra prediction on a PU, intra prediction module 46 may generate prediction data for the PU based on decoded samples of other PUs in the same picture. The prediction data for the PU may include a predicted video block and various syntax elements. Intra prediction module 46 may perform intra prediction on PUs in I slices, P slices, and B slices.

To perform intra prediction on a PU, intra prediction module 46 may use multiple intra prediction modes to generate multiple sets of prediction data for the PU. When intra prediction module 46 uses an intra prediction mode to generate a set of prediction data for the PU, intra prediction module 46 may extend samples from video blocks of neighboring PUs across the video block of the PU in a direction associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 46 may use various numbers of intra prediction modes, e.g., 33 directional intra prediction modes, depending on the size of the PU.

Intra prediction module 46 may select one of the sets of prediction data for the PU. Intra prediction module 46 may select the set of prediction data for the PU in various ways. For example, intra prediction module 46 may select the set of prediction data for the PU by calculating rate/distortion metrics for the sets of prediction data and selecting the set of prediction data that has the lowest rate/distortion metric.

Mode select module 40 may select the prediction data for a PU from among the prediction data generated by motion compensation module 42 for the PU or the prediction data generated by intra prediction module 46 for the PU. In some examples, mode select module 40 selects the prediction data for the PU based on rate/distortion metrics of the sets of prediction data.

After mode select module 40 selects the prediction data for PUs of a CU, residual generation module 50 may generate residual data for the CU by subtracting the predicted video block of the prediction data of the PUs of the CU from the video block of the CU. The residual data of a CU may include 2D residual video blocks that correspond to different sample components of the samples in the video block of the CU. For example, the residual data may include a residual video block that corresponds to differences between luminance samples in the predicted video blocks of the PUs of the CU and luminance samples in the original video block of the CU. In addition, the residual data of the CU may include residual video blocks that correspond to the differences between chrominance samples in the predicted video block of the PUs of the CU and the chrominance samples in the original video block of the CU.

Mode select module 40 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 52 may generate one or more transform coefficient blocks for each TU of a CU by applying one or more transforms to a residual video block associated with the TU. Each of the transform coefficient blocks may be a 2D matrix of transform coefficients. Transform module 52 may apply various transforms to the residual video block associated with a TU. For example, transform module 52 may apply a discrete cosine transform (DCT), a directional transform, or a conceptually similar transform to the residual video block associated with a TU. After transform module 52 generates a transform coefficient block for a TU, quantization module 54 may quantize the transform coefficients in the transform coefficient block.

Entropy encoding module 56 may receive a transform coefficient block from quantization module 54. When entropy encoding module 56 receives the transform coefficient block, entropy coding module 56 may generate a significance map for the transform coefficient block and a coordinate indicator. The coordinate indicator may indicate the coordinates in the transform coefficient block of a substitute coefficient. Assuming that the LSC of transform coefficient block occurs at the n'th position according to the coding scanning order, the substitute coefficient occurs at the n'th position according to the assumed scanning order. In some examples, entropy encoding module 56 may entropy encode the coordinate indicator as part of the significance map. Entropy encoding module 56 may also generate level information for the transform coefficient block. As explained above, the level information for the transform coefficient block may indicate magnitudes and signs of significant transform coefficients in the transform coefficient block.

Entropy encoding module 56 may perform entropy encoding operations on the coordinate indicator, the significance map, and the level information. For example, entropy encoding module 56 may perform CABAC, CAVLC, or PIPE operations on the coordinate indicator, the significance map, and/or the level information. In addition, entropy coding module 56 may entropy encode motion vector information, such as motion vectors or motion vector difference information, and any of a variety of other syntax elements useful in decoding the video data at video decoder 30.

To perform CAVLC, video encoder 20 may select a variable length code for a symbol to be transmitted. Codewords in CAVLC may be constructed such that relatively short codes correspond to more probable symbols, while relatively long codes correspond to less probable symbols. In this way, the use of CAVLC may achieve a bit savings over using equal-length codewords for each symbol to be transmitted. The probability determination may be based on a context assigned to the symbol.

Inverse quantization module 58 and inverse transform module 60 may apply inverse quantization and inverse transformation to the transform coefficient block, respectively, to reconstruct a residual video block from the transform coefficient block. Reconstruction module 62 may add the reconstructed residual video block to pixel values of one or more predicted video blocks generated by motion compensation module 44 or intra prediction module 46 to produce a reconstructed video block for storage in decoded picture buffer 64. Motion estimation module 42 and motion compensation module 44 may use a reference picture that contains the reconstructed video block to perform inter prediction on CUs of subsequent pictures.

Figure 6:
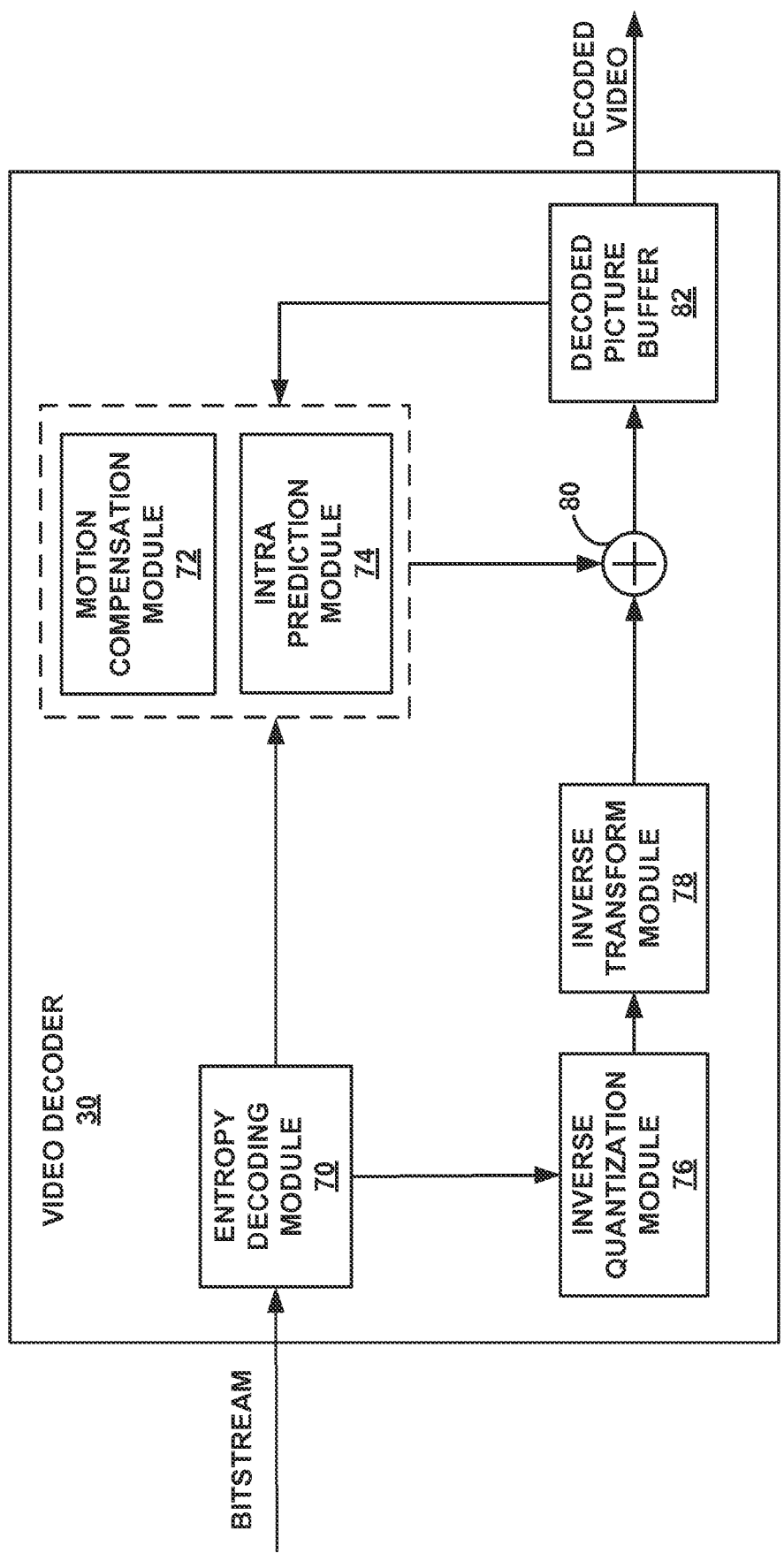
FIG. 6 is a block diagram that illustrates an example video decoder configured to implement the techniques of this disclosure.

FIG. 6 is a block diagram that illustrates an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes a plurality of functional components. The functional components of video decoder 30 include an entropy decoding module 70, a motion compensation module 72, an intra prediction module 74, an inverse quantization module 76, an inverse transform module 78, a reconstruction module 80, and a decoded picture buffer 82. In other examples, video decoder 30 may include more, fewer, or different functional components. For example, video decoder 30 may include a deblocking filter to filter the output of reconstruction module 80 to remove blockiness artifacts.

Video decoder 30 may receive a bitstream that comprises encoded video data. When video decoder 30 receives the bitstream, entropy decoding module 70 may perform a parsing operation on the bitstream. The parsing operation may extract syntax elements from the bitstream. As part of performing the parsing operation, entropy decoding module 70 may entropy decode entropy encoded syntax elements in the bitstream. Motion compensation module 72, intra prediction module 74, inverse quantization module 76, inverse transform module 78, and reconstruction module 80 may perform a reconstruction operation that generates decoded video data based on the syntax elements extracted from the bitstream.

The syntax elements extracted from the bitstream may include data that represent a coordinate indicator for a transform coefficient block associated with a TU of a CU, a significance map for the transform coefficient block, and level information for the transform coefficient block. The coordinate indicator may indicate coordinates of a substitute coefficient. Assuming that the LSC of transform coefficient block occurs at the n'th position according to the coding scanning order, the substitute coefficient occurs at the n'th position according to the assumed scanning order. As described above, the significance map may comprise a 1D vector of values that indicate whether corresponding transform coefficients in the transform coefficient block are significant. The values in the significance map may be sequenced according to the coding scanning order.

When video decoder 30 receives an entropy encoded coordinate indicator, entropy decoding module 70 may perform an entropy decoding operation on the entropy encoded coordinate indicator. In addition, entropy decoding module 70 may convert the coordinate indicator into a scan-based LSC indicator. As described above, the scan-based LSC indicator may indicate that the transform coefficient at the coordinates indicated by the coordinate indicator (i.e., the substitute coefficient) occurs at the n'th position according to the assumed scanning order. Entropy decoding module 70 may assume that video decoder 20 used the assumed scanning order to generate the coordinate indicator. Hence, entropy decoding module 70 may convert the coordinate indicator to a scan-based LSC indicator by determining the ordinal position of the transform coefficient indicated by the coordinate indicator in a 1D vector that results from sequencing the transform coefficients of the transform coefficient block according to the assumed scanning order. Furthermore, entropy decoding module 70 may assume that the resulting scan-based LSC indicator indicates the ordinal position of the LSC of the transform coefficient block according to the coding scanning order.

Figure 9:
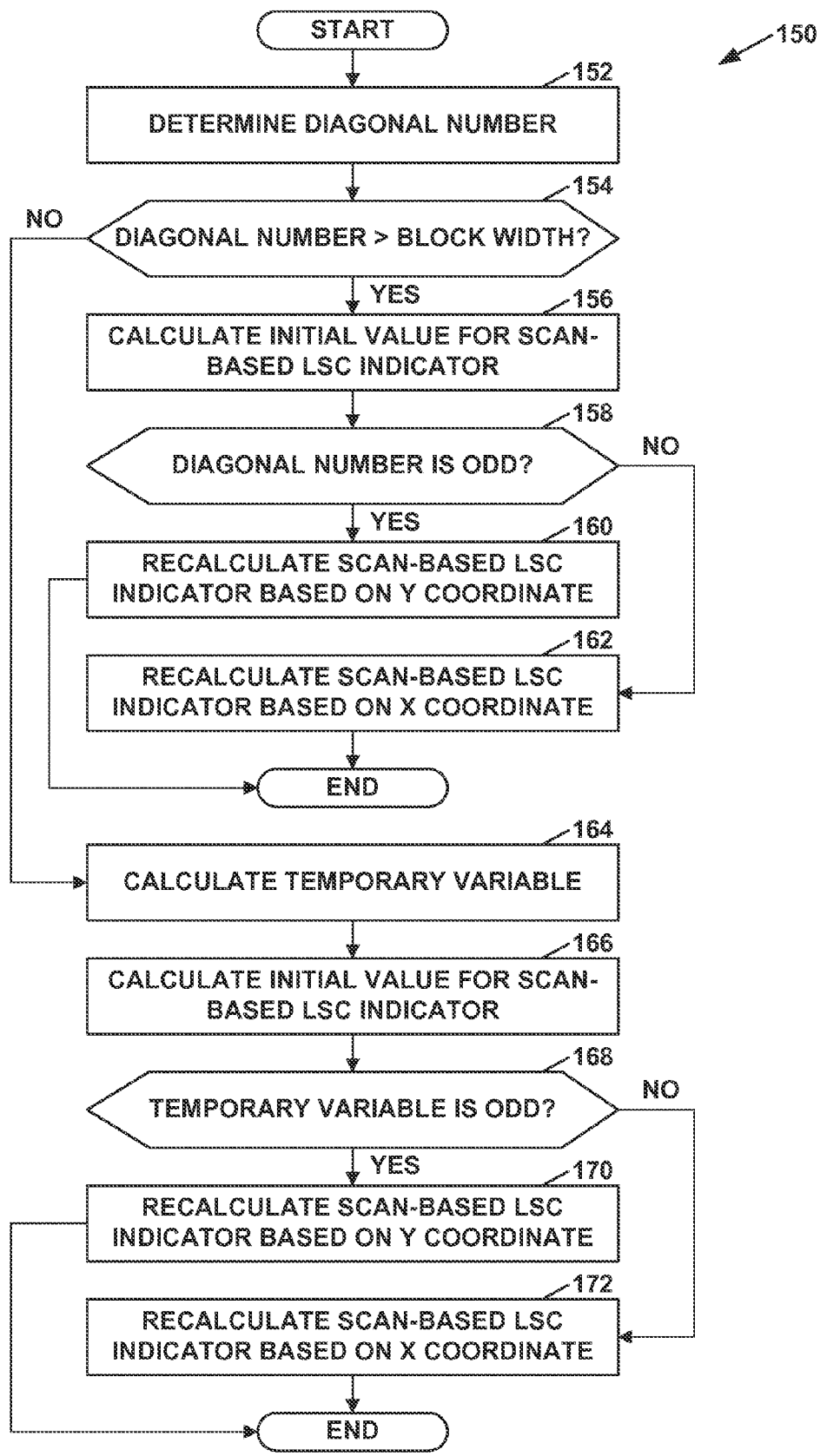
FIG. 9 is a flowchart that illustrates an example non-iterative operation to convert a coordinate indicator into a scan-based last significant coefficient (LSC) indicator.
Figure 10:
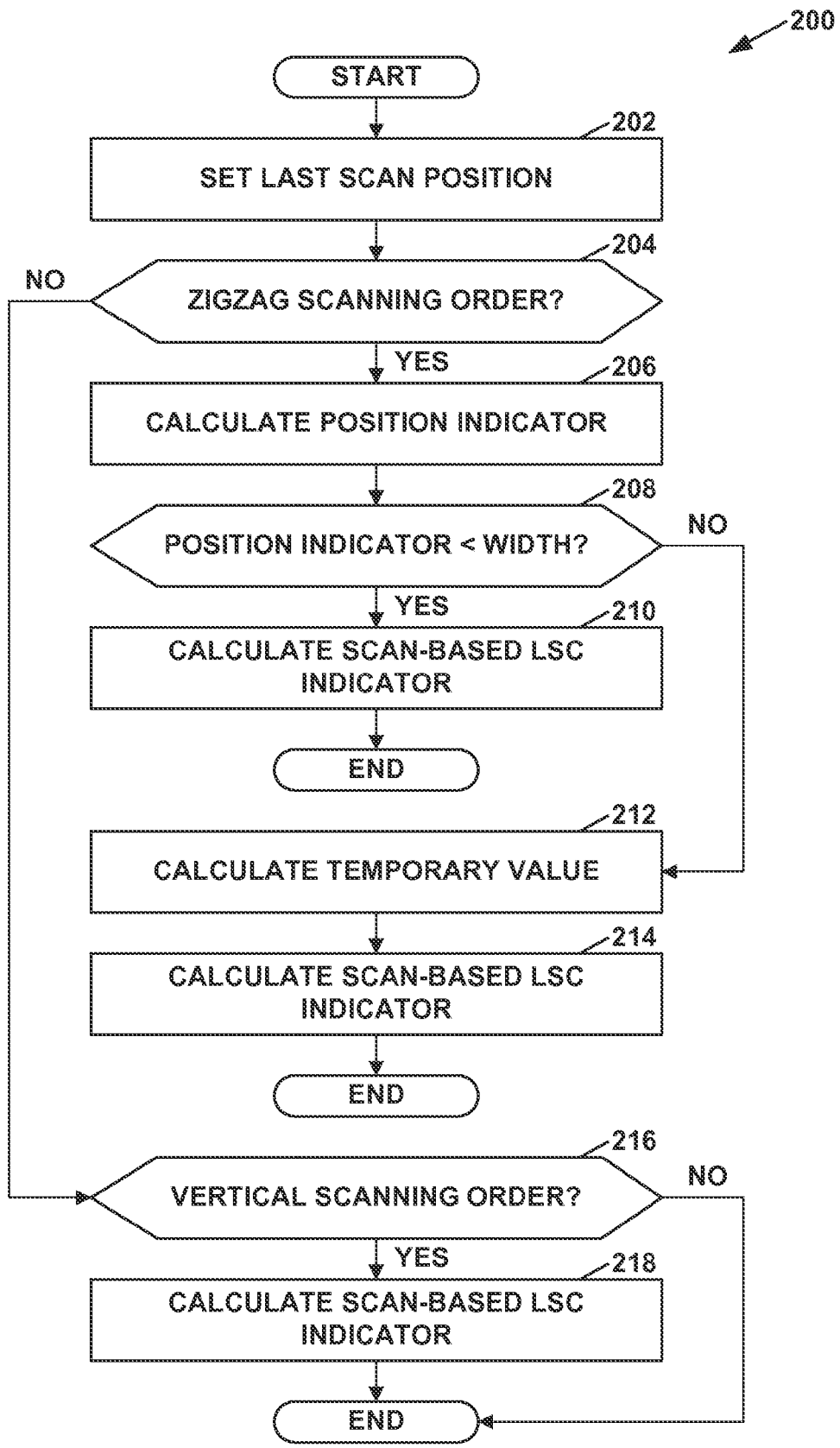
FIG. 10 is a flowchart that illustrates another example non-iterative operation to convert a coordinate indicator into a scan-based LSC indicator.
Figure 11:
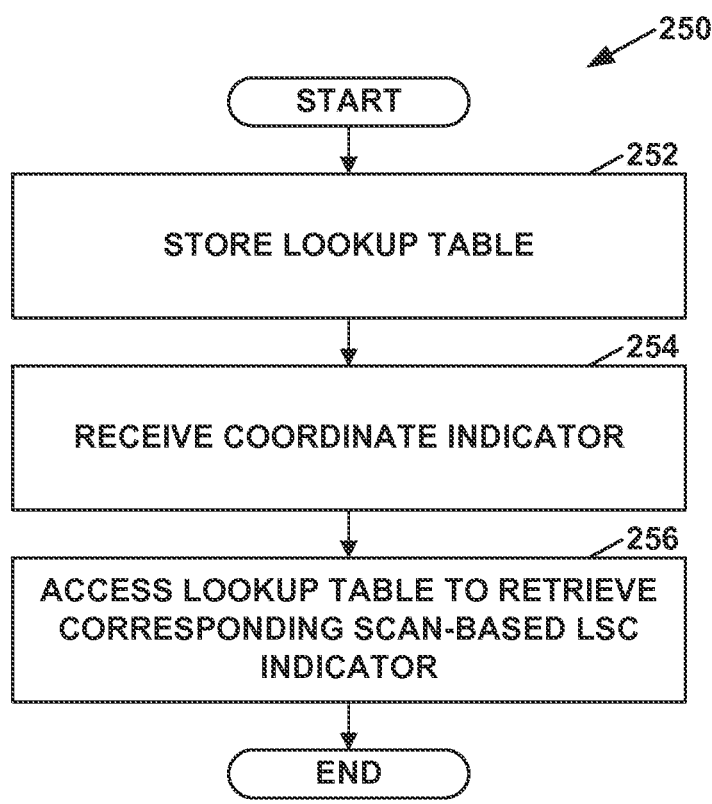
FIG. 11 is a flowchart that illustrates an example operation to convert a coordinate indicator into a scan-based LSC indicator in which a map data structure is accessed.
Figure 12:
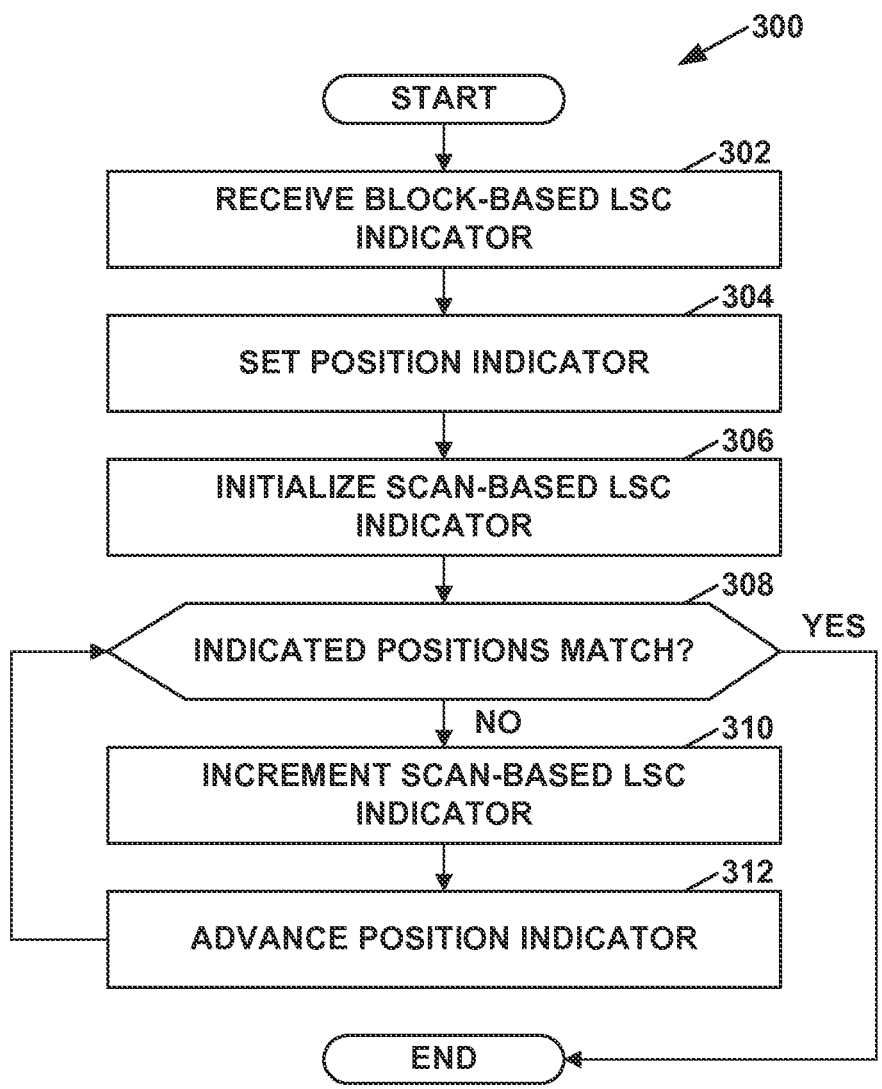
FIG. 12 is a flowchart that illustrates an example iterative operation to convert a coordinate indicator into a scan-based LSC indicator.

It may be desirable to convert the coordinate indicator into the scan-based LSC indicator in an efficient manner. Entropy decoding module 70 may perform various operations to convert the coordinate indicator into the scan-based LSC indicator. For example, entropy decoding module 70 may perform a non-iterative algorithm that derives the scan-based LSC indicator from the coordinate indicator. FIGS. 9 and 10, described in detail below, illustrate flowcharts of example non-iterative algorithms that may derive the scan-based LSC indicator from the coordinate indicator. In another example, entropy decoding module 70 may store a data structure that maps coordinate indicators to scan-based LSC indicators. In this example, entropy decoding module 70 may access this data structure to generate the scan-based LSC indicator. FIG. 11, described in detail below, illustrates an example operation in which video decoder 30 converts the coordinate indicator to a scan-based LSC indicator at least in part by accessing a data structure that maps coordinate indicators to scan-based LSC indicators. In yet another example, entropy decoding module 70 may generate the scan-based LSC indicator by performing a loop operation that scans through positions in a transform coefficient block according to the assumed scanning order until a transform coefficient having the coordinates specified by the coordinate indicator is reached. FIG. 12, described in detail below, illustrates an example iterative operation in which video decoder 30 converts a coordinate indicator into a scan-based LSC indicator by performing such a loop operation.

In some examples, entropy decoding module 70 may use different conversion operations based on different assumed scanning orders. For instance, entropy decoding module 70 may use the non-iterative algorithm mentioned above when the assumed scanning order is a horizontal scanning order and entropy decoding module 70 may use the mapping data structure mentioned above when the assumed scanning order is a reverse diagonal scanning order.

After converting the coordinate indicator into the scan-based LSC indicator, entropy decoding module 70 may determine the coding scanning order. In various examples, entropy decoding module 70 may determine the coding scanning order in different ways. For example, the coding scanning order may be signaled in the bitstream or may be inferred by entropy decoding module 70 from one or more syntax elements or parameters. If the transform coefficient block is associated with an intra-predicted PU, the scanning order may be inferred from an intra-prediction mode for the intra-predicted PU. In some examples, entropy decoding module 70 may determine the scanning order based on a size of the video block associated with the CU or a size of a transform coefficient block, a transform applied to generate the transform coefficient block, a partitioning mode of PUs of the CU, and/or based on other data.

After determining the coding scanning order, entropy decoding module 70 may determine, based on the coding scanning order and the scan-based LSC indicator, the coordinates of the LSC of the transform coefficient block. Entropy decoding module 70 may then entropy decode the significance map. In some examples, entropy decoding module 70 may entropy decode the significance map based on the coordinates of the LSC. In other examples, entropy decoding module 70 may entropy decode the significance map based on the scan-based LSC indicator. For example, entropy decoding module 70 may select a context model based on the coordinates of the LSC or the scan-based LSC indicator. In this example, entropy decoding module 70 may use the selected context model during a CABAC decoding operation that CABAC decodes the significance map. Entropy decoding module 70 may also perform a CABAC decoding operation that decodes the level information of the transform coefficient block. In some examples, entropy decoding module 70 may CABAC decode syntax elements in the level information using one or more context models selected based on the coordinates of the LSC or the scan-based LSC indicator.

After entropy decoding the significance map, entropy decoding module 70 may reconstruct the significance map based on the coordinates of the LSC. For instance, the bitstream may not include significance flags that indicate the significance of transform coefficients occurring after the LSC in coding scanning order. Accordingly, entropy decoding module 70 may reconstruct the significance map by synthesizing significance flags for transform coefficients having coordinates that occur after the coordinates of the LSC in coding scanning order.

After reconstructing the significance map and entropy decoding the level information, entropy decoding module 70 may reconstruct the transform coefficient block based on the significance map and the level information. The bitstream may not include level information for transform coefficients occurring after the LSC in coding scanning order. Accordingly, entropy decoding module 70 may synthesize zero-valued transform coefficients at coordinates that occur after the coordinates of the LSC in coding scanning order. In addition, entropy decoding module 70 may synthesize zero-valued transform coefficients at positions indicated by the significance map as containing non-significant coefficients. Entropy decoding module 70 may reconstruct the transform coefficient block by appropriately arranging the transform coefficients indicated by the level information and the synthesized transform coefficients. The transform coefficient block may generally match the transform coefficient block generated by quantization module 54 of video encoder 20. In this way, entropy decoding module 70 may entropy decode and/or reconstruct, based on the coordinates of the LSC, the significance map and/or level information of the transform coefficient block.

After entropy decoding module 70 recreates the transform coefficient block, inverse quantization module 76 may inverse quantize, i.e., de-quantize, the transform coefficient block. Inverse quantization module 76 may inverse quantize the transform coefficient block in a manner similar to the inverse quantization processes proposed for HEVC or defined by the H.264 decoding standard. Inverse quantization module 76 may use a quantization parameter QPY calculated by video encoder 20 for a CU associated with the transform coefficient block to determine a degree of quantization and, likewise, a degree of inverse quantization for inverse quantization module 76 to apply.

After inverse quantization module 76 inverse quantizes the transform coefficient block, inverse transform module 78 may generate a residual video block for the TU associated with the transform coefficient block. Inverse transform module 78 may generate the residual video block for the TU at least in part by applying one or more inverse transforms to the transform coefficient block. For example, inverse transform module 78 may apply an inverse DCT, an inverse integer transform, an inverse Karhunen-Loeve transform (KLT), an inverse rotational transform, an inverse directional transform, or another inverse transform to the transform coefficient block. In some examples, inverse transform module 78 may determine an inverse transform to apply to the transform coefficient block based on data signaled in the bitstream. In such examples, inverse transform module 78 may determine the inverse transform based on a transform signaled at the root node of a quadtree for a treeblock associated with the transform coefficient block. In other examples, inverse transform module 78 may infer the inverse transform from one or more coding characteristics, such as block size, coding mode, or the like. In some examples, inverse transform module 78 may apply a cascaded inverse transform.

If a PU of the CU was encoded using inter prediction, motion compensation module 72 may perform motion compensation to generate a predicted video block for the PU. Motion compensation module 72 may use motion information for the PU to identify a reference block for the PU. The reference block of a PU may be in a different temporal picture than the PU. The motion information for the PU may include a motion vector, a reference picture index, and a prediction direction. Motion compensation module 72 may use the reference block for the PU to generate the predicted video block for the PU. In some examples, motion compensation module 72 may predict the motion information for the PU based on motion information of PUs that neighbor the PU. In this disclosure, a PU is an inter-predicted PU if video encoder 20 uses inter prediction to generate the predicted video block of the PU.

In some examples, motion compensation module 72 may refine the predicted video block of a PU by performing interpolation based on interpolation filters. Identifiers for interpolation filters to be used for motion compensation with sub-sample precision may be included in the syntax elements. Motion compensation module 72 may use the same interpolation filters used by video encoder 20 during generation of the predicted video block of the PU to calculate interpolated values for sub-integer samples of a reference block. Motion compensation module 72 may determine the interpolation filters used by video encoder 20 according to received syntax information and use the interpolation filters to produce the predicted video block.

If a PU is encoded using intra prediction, intra prediction module 74 may perform intra prediction to generate a predicted video block for the PU. For example, intra prediction module 74 may determine an intra prediction mode for the PU based on syntax elements in the bitstream. The bitstream may include syntax elements that intra prediction module 74 may use to predict the intra prediction mode of the PU.

Reconstruction module 80 may use the residual video blocks associated with a CU and the predicted video blocks of the PUs of the CU, i.e., either intra-prediction data or inter-prediction data, as applicable, to reconstruct the video block of the CU. Decoded picture buffer 82 may store decoded samples for pictures of the video data. Decoded picture buffer 82 may provide reference pictures for subsequent motion compensation, intra prediction, and presentation on a display device, such as display device 32 of FIG. 1. For instance, video decoder 30 may perform, based on the video blocks in decoded picture buffer 82, intra prediction or inter prediction operations on PUs of other CUs.

Figure 7:
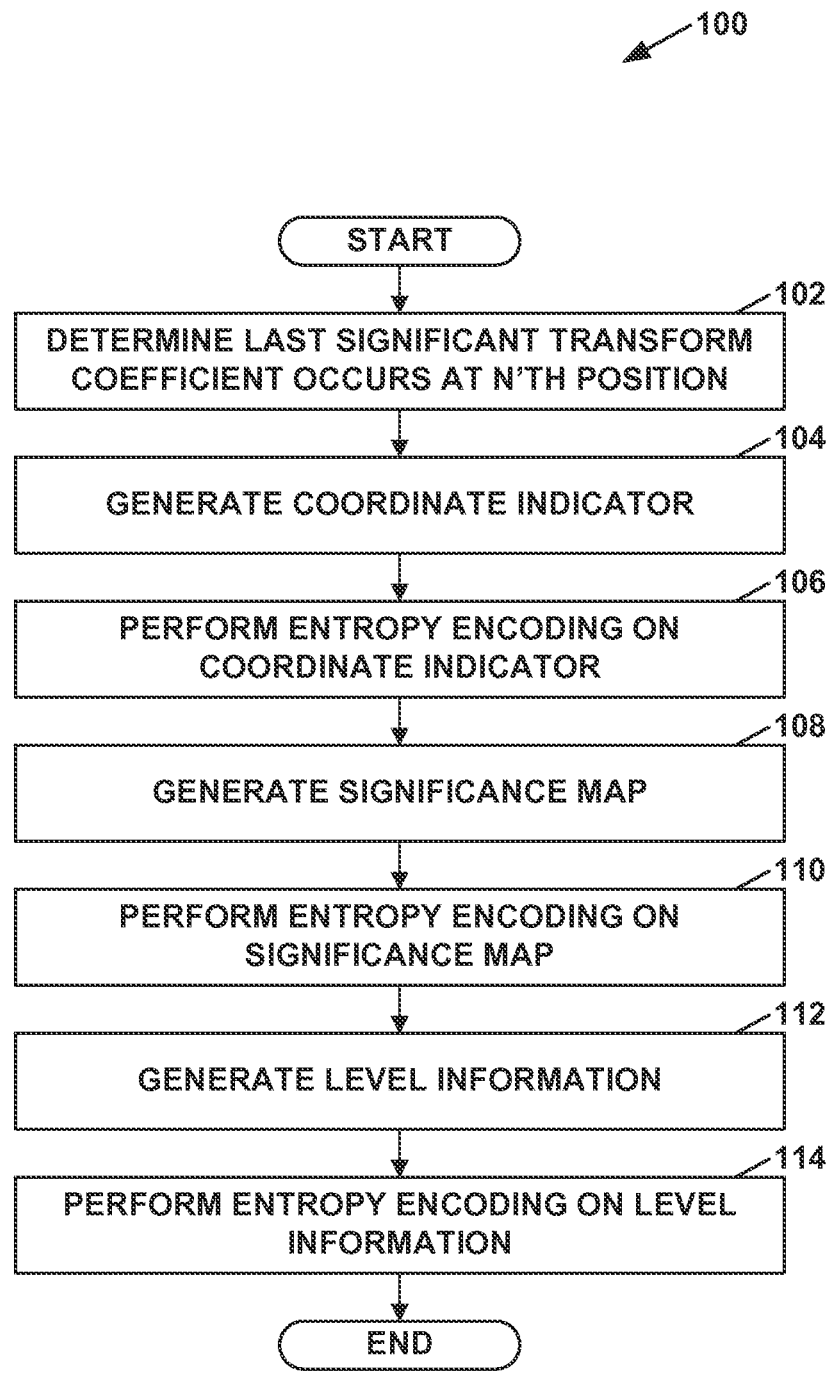
FIG. 7 is a flowchart that illustrates an example operation performed by the video encoder.

FIG. 7 is a flowchart that illustrates an example operation 100 performed by video encoder 20. After entropy encoding module 56 starts operation 100, video encoder 20 may determine that the LSC of a transform coefficient block occurs at the n'th position of the transform coefficient block according to a coding scanning order (102). Video encoder 20 may then generate a coordinate indicator that indicates the coordinates of a substitute coefficient (i.e., a given transform coefficient) of the transform coefficient block (104). The substitute coefficient occurs at the n'th position of the transform coefficient block according to the assumed scanning order.

After generating the coordinate indicator, video encoder 20 may perform an entropy encoding operation on the coordinate indicator (106). Video encoder 20 may perform the entropy encoding operation on the coordinate indicator in various ways. For instance, in some examples, video encoder 20 may first convert each coordinate of the coordinate indicator into a binary code. In other words, video encoder 20 may "binarize" the coordinates of the coordinate indicator. After binarizing the x and y coordinates, video encoder 20 may select a context model for encoding the binarized y coordinate of the coordinate indicator. In some instances, video encoder 20 may select the context model for encoding the binarized y coordinate based on the x coordinate of the coordinate indicator. Video encoder 20 may use the selected context model when encoding one or more bins of the binarized y coordinate. Similarly, video encoder 20 may select a context model for encoding the binarized x coordinate of the coordinate indicator based on the y coordinate of the coordinate indicator. Video encoder 20 may use the selected context model when encoding one or more bins of the binarized x coordinate.

There may be a statistical relationship between the x coordinate and the y coordinate of the coordinate indicator. For instance, significant transform coefficients tend to cluster around the DC transform coefficients of transform coefficient blocks. Thus, if the x coordinate is relatively close to the DC transform coefficient, the y coordinate is also likely to be relatively close to the DC transform coefficient, and vice versa. By selecting the context model for the y coordinate based on the x coordinate, video encoder 20 may be able to exploit this statistical relationship in order to more accurately select the context model for the y coordinate. Likewise, by selecting the context model for the x coordinate based on the y coordinate, video encoder 20 may be able to exploit this statistical relationship in order to more accurately select the context model for the x coordinate.

In some examples, video encoder 20 may interleave the entropy encoding operations of symbols for the x and y coordinates. For example, video encoder 20 may first perform the entropy encoding operation for the first bin of the binarized x coordinate. After encoding the first bin of the x coordinate, video encoder 20 may perform the entropy encoding operation on a first bin of the y coordinate. Then, video encoder 20 may perform the entropy encoding operation on the second bin of the binarized x coordinate. Video encoder 20 may continue encoding symbols of the x and y coordinates until video encoder 20 has encoded each of the bins of the binarized x and y coordinates.

In some examples, video encoder 20 may map the transform coefficients from a transform coefficient block into another 2D transform coefficient block using a scanning order. For instance, the other 2D transform coefficient block may be eight positions wide. In this example, video encoder 20 may map the first eight transform coefficients of the transform coefficient block as determined by the scanning order into the first row of the other 2D transform coefficient block, the second eight transform coefficients of the transform coefficient block as determined by the scanning order into the second row of the other 2D transform coefficient block, and so on. In this example, video encoder 20 may then identify the last significant transform coefficient of the other 2D transform coefficient block according to the scanning order and generate a coordinate indicator that indicates the last significant transform coefficient of the other 2D transform coefficient block. In this example, a statistical relationship may exist between lower row numbers and the probability of a transform coefficient being significant. For instance, the probability of a transform coefficient being significant may be higher in low row numbers than in high row numbers. Video encoder 20 may exploit this statistical relationship when performing the entropy encoding operation on the coordinate indicator. For instance, video encoder 20 may first perform the entropy encoding operation on the y coordinate and then perform the entropy encoding operation on the x coordinate. When video encoder 20 performs the entropy encoding operation on the x coordinate, video encoder 20 may select a context model based on the y coordinate.

Furthermore, video encoder 20 may generate a significance map for the transform coefficient block (108). In some examples, video encoder 20 may generate the significance map and identify the LSC of the transform coefficient block in parallel. Video encoder 20 may generate the significance map in various ways.

For example, video encoder 20 may generate a 1D vector to serve as the significance map. In this example, video encoder 20 may use a reverse scanning order to map the transform coefficient block into a 1D vector of transform coefficients. The reverse scanning order may be the inverse of a scanning order used to generate the level information of the transform coefficient block. Video encoder 20 may use a reverse scanning order to map the transform coefficients from the 2D block to the 1D vector because a statistical relationship may exist between the position of the LSC and whether a given transform coefficient is significant. For instance, if video encoder 20 proceeds from the last (e.g., lower-right) position of the transform coefficient block, the probability of the next transform coefficient being significant may be relatively low until a significant transform coefficient is observed. After a significant transform coefficient is observed, the probability of observing another significant transform coefficient are considerably higher than prior to observing the significant transform coefficient. Video encoder 20 may exploit this statistical relationship when selecting context models to use when performing an entropy encoding operation on the significance map. Thus, video encoder 20 may be able to encode the significance map more efficiently. In other examples, video encoder 20 may use the same scanning order to generate the significance map for the transform coefficient block as video encoder 20 uses to generate the coordinate indicator and level information for the transform coefficient block. Video encoder 20 may then scan through the 1D vector of transform coefficients and indicate in the significance map whether the transform coefficients are significant or not significant.

Furthermore, video encoder 20 may perform an entropy encoding operation on the significance map (110). In some examples, video encoder 20 may interleave steps 108 and 110. For instance, video encoder 20 may generate a first bin of the significance map and then entropy encode the first bin of the significance map. After entropy encoding the first bin of the significance map, video encoder 20 may generate a second bin of the significance map and then entropy encode the second bin of the significance map, and so on.

Video encoder 20 may perform the entropy encoding operation on the significance map in various ways. For example, video encoder 20 may select a context model based on the position of the LSC of the transform coefficient block. There may be a statistical relationship between the position of the LSC and the value of the next bin (in reverse scanning order) of the significance map. For instance, if video encoder 20 uses a reverse scanning order to generate the significance map and the LSC of the transform coefficient block is relatively distant from the DC transform coefficient of the transform coefficient block, the probability of the next bin of the significance map being 1 is relatively greater than if the LSC of the transform coefficient block is relatively close to the DC transform coefficient of the transform coefficient block. By selecting the context model based on the LSC of the transform coefficient block, video encoder 20 may be able to exploit this statistical relationship in order to more accurately select the context model for entropy encoding the significance map. After selecting the context model for the significance map, video encoder 20 may use the context model to entropy encode one or more bins of the significance map. During the entropy encoding operation on the significance map, video encoder 20 may adjust the probability indicated by the context models when entropy encoding subsequent bins of the significance map.

In other examples, video encoder 20 may exploit the statistical relationship between the LSC and the significance map in other ways. For example, the ordinal position of the LSC indicates a position of the LSC according to the scanning order. In this example, video encoder 20 may use a given context model to encode the significance map if the ordinal position of the LSC is greater than a given threshold and another context model to encode the significance map if the ordinal position of the LSC is not greater than the given threshold. Using different context models in this manner may improve coding efficiency.

In another example, video encoder 20 may exploit the statistical relationship between the LSC and the significance map by grouping transform coefficients. For instance, in this example, video encoder 20 may group three transform coefficients together and encode the resulting group as a single transform coefficient. Thus, video encoder 20 may encode three transform coefficients at a time. If all three transform coefficients in a group are 0, then video encoder 20 may encode the three transform coefficients as 0. If not, video encoder 20 may generate a 1 flag and may generate flags indicating which of the three corresponding transform coefficients are significant.

In some instances, all of the significant transform coefficients of a transform coefficient block may be located within a small region at the upper left corner of the transform coefficient block. For example, all of the significant transform coefficients of a transform coefficient block may be located within a 4×4 region at the upper left corner of the transform coefficient block. In such instances, it may require fewer bits to indicate the LSC of the transform coefficient block using a scan-based LSC indicator than a coordinate indicator. Hence, in some examples, video encoder 20 may generate a scan-based LSC indicator instead of a coordinate indicator when all of the significant transform coefficients are within the region. In such examples, video encoder 20 may generate a coordinate indicator if the transform coefficient block includes one or more significant transform coefficients outside the region. Furthermore, in some such examples, video encoder 20 may include a flag in the bitstream to indicate whether the LSC is indicated using a coordinate indicator or a scan-based LSC indicator.

In addition, video encoder 20 may generate level information for the transform coefficient block (112). Furthermore, video encoder 20 may perform an entropy encoding operation on the level information (114). In some examples, video encoder 20 may interleave steps 112 and 114. For instance, video encoder 20 may generate and binarize the level information of a first transform coefficient and then entropy encode the binarized level information of the first transform coefficient. After entropy encoding the binarized level information of the first transform coefficient, video encoder 20 may generate and binarize the level information of a second transform coefficient and then entropy encode the binarized level information of the second transform coefficient, and so on.

In some examples, the level information of each transform coefficient includes magnitudes and signs of the transform coefficients. To generate the level information of the transform coefficients, video encoder 20 may use the coding scanning order to scan through the transform coefficients in the transform coefficient block. When video encoder 20 encounters a significant transform coefficient while scanning through the transform coefficients, video encoder 20 may binarize and entropy encode a magnitude value and a sign value of the significant transform coefficient. The magnitude value indicates an absolute value of the significant transform coefficient. The sign value indicates a positive/negative sign of the significant transform coefficient.

In some examples, when video encoder 20 binarizes the level information of a transform coefficient, the first bin of the binarized level information may indicate whether the transform coefficient is significant. Thus, in such examples, generating the significance map in step 108 may be part of generating the level information in step 112 and entropy encoding the significance map in step 110 may be part of entropy encoding the level information in step 114.

Figure 8:
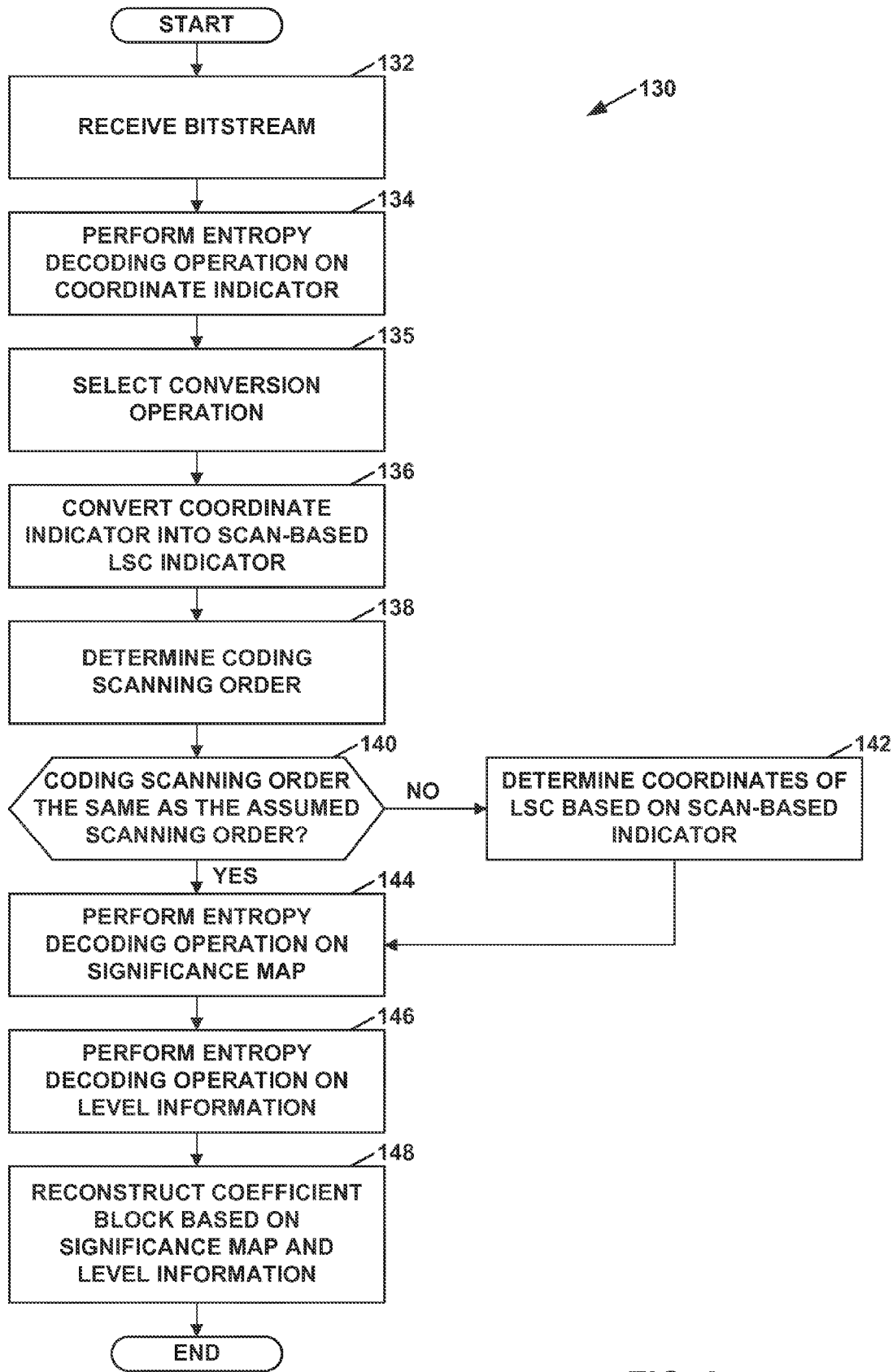
FIG. 8 is a flowchart that illustrates an example operation to decode a transform coefficient block.

FIG. 8 is a flowchart that illustrates an example operation 130 to decode a transform coefficient block. After video decoder 30 starts operation 130, video decoder 30 may receive a bitstream that comprises data representing a coordinate indicator for a transform coefficient block associated with a TU of a CU, a significance map for the transform coefficient block, and level information for the transform coefficient block (132). The encoded video bitstream may comprise other encoded information.

After receiving the data that represents the coordinate indicator, video decoder 30 may perform an entropy decoding operation to entropy decode the encoded coordinate indicator (134). After video decoder 30 decodes the coordinate indicator, video decoder 30 may select a conversion operation (135). In some examples, video decoder 30 may select the conversion operation based on the assumed scanning order.

Video decoder 30 may then use the selected conversion operation to convert the coordinate indicator into a scan-based LSC indicator (136). In various examples, video decoder 30 may convert the coordinate indicator into the scan-based LSC indicator in various ways. For example, video decoder 30 may use the example operations shown in FIGS. 9-12 to convert the coordinate indicator into the scan-based LSC indicator. During the conversion operation, video decoder 30 may assume that the scanning order is the assumed scanning order. In other examples, video decoder 30 may perform a combination of one or more of the example operations of FIGS. 9-12 to convert the coordinate indicator into the scan-based LSC indicator. Furthermore, in yet other examples, video decoder 30 does not select a conversion operation after entropy decoding a coefficient indicator. Rather, in some such examples, video decoder 30 may only be configured to perform one specific conversion operation.

In the example of FIG. 8, after video decoder 30 converts the coordinate indicator into the scan-based LSC indicator, video decoder 30 may determine the coding scanning order (138). Video decoder 30 may then determine whether the coding scanning order is the same as the assumed scanning order (140). If the coding scanning order is not the same as the assumed scanning order ("NO" of 140), video decoder 30 may determine the coordinates of the LSC based on the scan-based LSC indicator and the coding scanning order (142). If the coding scanning order is the same as the assumed scanning order, video decoder 30 does not need to determine the coordinates of the LSC based on the scan-based LSC indicator because the received coordinate indicator already indicates coordinates of the LSC.

After determining that the coding scanning order is the same as the assumed scanning order ("YES" of 140) or after determining the coordinates of the LSC based on the scan-based LSC indicator, video decoder 30 may use the coordinates of the LSC or the scan-based LSC indicator to entropy decode the significance map for the transform coefficient block (144). For instance, video decoder 30 may select, based on the coordinates of the LSC, one or more CABAC contexts for CABAC decoding the significance map.

In other examples, video decoder 30 may use the scan-based LSC indicator to decode the significance map. For example, the scan-based LSC indicator may indicate the number of bins that indicate significant transform coefficients to be decoded. In addition, as described above, there may be a statistical relationship between the number of transform coefficients occurring prior the LSC in coding scanning order and the probability of a bin of the significance map being a 1 or 0. The scan-based LSC indicator indicates the number of transform coefficients occurring prior to the LSC in the scanning order. Accordingly, video decoder 30 may select, based on the scan-based LSC indicator, a context model from among a plurality of available context models. Video decoder 30 may then use the selected context model to decode one or more bins of the significance map.

After video decoder 30 entropy decodes the significance map for the transform coefficient block, video decoder 30 may perform entropy decoding operations on the level information for the transform coefficient block (146). When video decoder 30 performs the entropy decoding operation on the level information, video decoder 30 may select, based on the scan-based LSC indicator or the coordinates of the LSC, one or more CABAC contexts for CABAC decoding syntax elements of the level information. In addition, video decoder 30 may reconstruct the coefficient block based on the significance map and the level information of the transform coefficient block (148).

In some examples, video decoder 30 may interleave steps 146 and 148. For instance, video decoder 30 may entropy decode level information for a first significant transform coefficient and then use the significance map to insert the level information of the first significant transform coefficient into the transform coefficient block. After video decoder 30 inserts the level information for the first significant transform coefficient into the transform coefficient block, video decoder 30 may entropy decode the level information of a second significant transform coefficient and may use the significance map to insert the level information of the second significant transform coefficient into the transform coefficient block, and so on.

As described above, the level information for the transform coefficient block may indicate magnitudes and signs of significant coefficients. The magnitudes specify the absolute values of the significant transform coefficients in the transform coefficient block. The signs specify the positive/negative signs of the significant transform coefficients in the transform coefficient block. In some examples, the level information does not include magnitudes or signs of the non-significant transform coefficients within the transform coefficient block. Hence, the level information may not include information indicate the positions of the transform coefficient block that correspond to the magnitudes and signs. Accordingly, video decoder 30 may use the significance map to determine the positions within the transform coefficient block that correspond to the magnitude and sign values. For instance, video decoder 30 may use the significance map to inject "0" values at the positions of the transform coefficient block associated with the non-significant transform coefficients. In this instance, video decoder

30 may then use the coding scanning order to map the magnitudes into the transform coefficient block.

As described above, in some examples, the first bin of the binarized level information of a transform coefficient may indicate whether the transform coefficient is significant. Thus, the significance map may be integrated into the binarized level information of the transform coefficients. In such examples, performing the entropy decoding operation on the significance map in step 138 may be part of performing the entropy decoding operation on the level information in step 140.

FIG. 9 is a flowchart that illustrates an example non-iterative operation 150 to convert a coordinate indicator for a transform coefficient block into a scan-based LSC indicator for the transform coefficient block. In the example of FIG. 9, operation 150 assumes that the assumed scanning order is the zigzag scanning order. After video decoder 30 starts operation 150, video decoder 30 may determine the value of a diagonal number variable (152). Video decoder 30 may determine the value of the diagonal number variable by adding the y-coordinate of the coordinate indicator and the x-coordinate of the coordinate indicator.

Next, video decoder 30 may determine whether the diagonal number variable is greater than a block width of the transform coefficient block (154). If the diagonal number is greater than the block width of the transform coefficient block ("YES" of 154), video decoder 30 calculates an initial value for the scan-based LSC indicator (156). Video decoder 30 may calculate the initial value for the scan-based LSC indicator as follows: ScanPositionLast=DiagNum*(DiagNum+1))>>1, where "ScanPositionLast" is the scan-based LSC indicator, "DiagNum" represents the diagonal number variable, and ">>" represents the right-shift operation.

Next, video decoder 30 may determine whether the diagonal number variable is an odd number (158). In some examples, video decoder 30 may determine whether the diagonal number variable is odd as follows: (DiagNum % 2)==1. In response to determining that the diagonal number variable is an odd number ("YES" of 158), video decoder 30 may recalculate the scan-based LSC indicator based on the y-coordinate of the coordinate indicator (160). For instance, video decoder 30 may recalculate the scan-based LSC indicator by adding the y-coordinate of the coordinate indicator to the initial value of the scan-based LSC indicator. Otherwise, in response to determining that the diagonal number variable is not an odd number ("NO" of 158), video decoder 30 may recalculate the scan-based LSC indicator based on the x-coordinate of the coordinate indicator (162). For instance, video decoder 30 may recalculate the scan-based LSC indicator by adding the x-coordinate of the coordinate indicator to the initial value of the scan-based LSC indicator.

If the diagonal number variable is not greater than the block width ("NO" of 154), video decoder 30 may calculate the value of a temporary variable (164). Video decoder 30 may calculate the value of the temporary variable as follows: (BlockWidth−1)<<1)−DiagNum, where "BlockWidth" indicates the width of the transform coefficient block and "<<" represents the left shift operation. After calculating the temporary value, video decoder 30 may calculate an initial value of the scan-based LSC indicator (166). Video decoder 30 may calculate the initial value of the scan-based LSC indicator as follows: MaxNumCoeffM1−((T*(T+1))>>1), where "MaxNumCoeffM1" is the maximum number of transform coefficients that the transform coefficients may have and "T" is the temporary variable.

Video decoder 30 may then determine whether the temporary variable is odd (168). If the temporary variable is odd ("YES" of 168), video decoder 30 may recalculate the scan-based LSC indicator based on the y-coordinate of the coordinate indicator (170). For instance, video decoder 30 may recalculate the scan-based LSC indicator as follows: ScanPositionLast=ScanPositionLast−BlockWidth+1+PositionLastY, where "ScanPositionLast" is the scan-based LSC indicator, "BlockWidth" is the width of the transform coefficient block, and "PositionLastY" is the y-coordinate of the coordinate indicator.

Otherwise, if the temporary variable is not odd ("NO" of 168), video decoder 30 may recalculate the scan-based LSC indicator based on the x-coordinate of the coordinate indicator (172). For instance, video decoder 30 may recalculate the scan-based LSC indicator as follows: ScanPositionLast=ScanPositionLast−BlockWidth+1+PositionLastX, where "ScanPositionLast" is the scan-based LSC indicator, "BlockWidth" is the width of the transform coefficient block, and "PositionLastX" is the x-coordinate of the coordinate indicator.

The following pseudo-code describes a non-iterative algorithm in accordance with the example of FIG. 9 that derives the scan-based LSC indicator from the coordinates specified by the coordinate indicator.

```
1.   DiagNum = PositionLastY + PositionLastX
2.   If ( DiagNum < BlockWidth)
     a.   ScanPositionLast = ( DiagNum * (DiagNum + 1) ) >> 1
     b.   If ((DiagNum % 2) == 1 )
            i.   ScanPositionLast = ScanPositionLast +
                 PositionLastY
     c.   Else
            i.   ScanPositionLast = ScanPositionLast +
                 PositionLastX
3.   Else
     a.   T = ( (BlockWidth−1) << 1 ) − DiagNum
     b.   ScanPositionLast = MaxNumCoeffM1 − (( T * (T +
          1) ) >> 1)
     c.   If ((T % 2) == 1 )
            i.   ScanPositionLast = ScanPositionLast −
                 BlockWidth + 1 + PositionLastY
     d.   Else
            i.   ScanPositionLast = ScanPositionLast −
                 BlockWidth + 1 + PositionLastX
```

In this pseudo-code, "PositionLastY" and "PositionLastX" are the x and y coordinates indicated by the coordinate indicator (assuming the DC component is at coordinates (0, 0)), and "BlockWidth" is the width of the transform coefficient block, << is the left-shift operation, >> is the right-shift operation, % is the modulus operation, and "MaxNumCoeffM1" is the maximum number of transform coefficients that the transform coefficient block may have (i.e., BlockWidth*BlockHeight−1).

The following pseudo-code is similar to the pseudo-code above, but converts a coordinate indicator into a scan-based LSC indicator when a top-right to bottom-left diagonal scan is used:

```
1.   DiagNum = PositionLastY + PositionLastX
2.   If ( DiagNum < BlockWidth)
     a.   ScanPositionLast = ( DiagNum * (DiagNum + 1) ) >> 1
     b.   ScanPositionLast = ScanPositionLast + PositionLastX
3.   Else
     a.   T = ( (BlockWidth−1) << 1 ) − DiagNum
     b.   ScanPositionLast = MaxNumCoeffM1 − (( T * (T +
          1) ) >> 1)
```

```
    c.   If ((T % 2) == 1 )
            i.    ScanPositionLast = ScanPositionLast −
                  BlockWidth + 1 + PositionLastY
    d.   Else
            i.    ScanPositionLast = ScanPositionLast −
                  BlockWidth + 1 + PositionLastX
```

The following pseudo-code is similar to the pseudo-code above, but converts a coordinate indicator into a scan-based LSC indicator when a bottom-left to top-right diagonal scan is used:

```
1.  DiagNum = PositionLastY + PositionLastX
2.  If ( DiagNum < BlockWidth)
        a.   ScanPositionLast = ( DiagNum * (DiagNum + 1) ) >> 1
        b.   ScanPositionLast = ScanPositionLast + PositionLastY
3.  Else
        a.   T = ( (BlockWidth−1) << 1 ) − DiagNum
        b.   ScanPositionLast = MaxNumCoeffM1 − (( T * (T +
             1) ) >> 1)
        c.   If ((T % 2) == 1 )
                i.   ScanPositionLast = ScanPositionLast −
                     BlockWidth + 1 + PositionLastY
        d.   Else
                i.   ScanPositionLast = ScanPositionLast −
                     BlockWidth + 1 + PositionLastX
```

FIG. 10 is a flowchart that illustrates another example non-iterative operation 200 to convert a coordinate indicator into a scan-based LSC indicator. In the example of FIG. 10, video decoder 30 may store a transform coefficient block in memory in a 1D array. In this 1D array, transform coefficients in a top row of the transform coefficient block are followed by transform coefficients in a next lower row, which are followed by transform coefficients associated with a next lower row, and so on.

After video decoder 30 starts operation 200, video decoder 30 may set the scan-based LSC indicator to a value that indicates a position in the 1D array that is associated with the coordinates indicated by the coordinate indicator (202). Video decoder 30 may determine the position in the 1D array by multiplying the y-coordinate specified by the coordinate indicator by the width of the transform coefficient block and then adding the x-coordinate specified by the coordinate indicator. If the scanning order is the horizontal scanning order, video decoder 30 may not need to perform any further processing to obtain the scan-based LSC indicator.

Next, video decoder 30 may determine whether the assumed scanning order is the zigzag scanning order (204). In response to determining that the assumed scanning order is the zigzag scanning order ("YES" of 204), video decoder 30 may calculate a diagonal number ("uID") position indicator as a sum of the y-coordinate ("uiPosLastY") of the coordinate indicator and the x-coordinate ("uiPosLastX") of the coordinate indicator (206). Video decoder 30 may then determine whether the diagonal number is less than the width of the transform coefficient block ("uiWidth") (208).

In response to determining that the diagonal number is less than the width of the transform coefficient block ("YES" of 208), video decoder 30 may calculate a value for the scan-based LSC indicator ("uiScanPosLast") based on the diagonal number (210). For example, video decoder 30 may calculate the initial value for the scan-based LSC indicator as follows: uiScanPosLast=uiD*(uiD+1))>>1, where "uiScanPosLast" is the scan-based LSC indicator and "uiD" is the diagonal number. In this example, if the diagonal number is an even number, video decoder 30 may then calculate the final value for the scan-based LSC indicator by adding the y-coordinate of the coordinate indicator to the initial value of the scan-based LSC indicator. If the diagonal number is an odd number, video decoder 30 may calculate the final value for the scan-based LSC indicator by adding the x-coordinate of the coordinate indicator to the initial value of the scan-based LSC indicator.

Otherwise, in response to determining that the position identifier is not less than the width of the transform coefficient block ("NO" of 208), video decoder 30 may calculate a temporary value ("uiDI") (212). Video decoder 30 may calculate the temporary value as follows: uiDI=((uiWidth−1)<<1)−uiD, where "uiDI" is the temporary value, "uiWidth" is the width of the transform coefficient block, and "uiD" is the diagonal number. After calculating the temporary value, video decoder 30 may calculate the scan-based LSC indicator based on the temporary value (214).

Video decoder 30 may calculate an initial value of the scan-based LSC indicator as follows: uiScanPosLast=uiMaxNumCoeffM1−(uiDI*(uiDI+1)>>1), where "uiScanPosLast" is the scan-based LSC indicator, "uiMaxNumCoeffM1" is the maximum number of transform coefficients that that transform coefficient block may have, and "uiDI" is the temporary value. If the temporary value is even, video decoder 30 may calculate the final value of the scan-based LSC indicator by subtracting uiWidth−1−uiPosLastY from the initial value of the scan-based LSC indicator, where "uiWidth" is the width of the transform coefficient block and "uiPosLastY" is the y-coordinate of the coordinate indicator. If the temporary value is odd, video decoder 30 may calculate the final value of the scan-based LSC indicator by subtracting uiWidth−1−uiPosLastX from the initial value of the scan-based LSC indicator, where "uiWidth" is the width of the transform coefficient block and "uiPosLastX" is the x-coordinate of the coordinate indicator.

In response to determining that the assumed scanning order is not the zigzag scanning order ("NO" of 204), video decoder 30 may determine whether the assumed scanning order is the vertical scanning order (216). In response to determining that the assumed scanning order is the vertical scanning order ("YES" of 216), video decoder 30 may calculate the scan-based LSC indicator from the coordinate indicator and the size of the transform coefficient block (218). For instance, video decoder 30 may calculate the scan-based LSC indicator as: uiScanPosLast=uiPosLastY+(uiPosLastX<<uiLog2BlockSize), where uiScanPosLast is the scan-based LSC indicator, uiPosLastY is the y-coordinate of the coordinate indicator, uiPosLastX is the x-coordinate of the coordinate indicator, and "uiLog2BlockSize" is the log-base 2 of the size of the transform coefficient block.

The following code describes an example algorithm for converting the coordinate indicator into a scan-based LSC indicator when the assumed scanning order is the horizontal, vertical, or zigzag scanning order in accordance with the example of FIG. 10. The storage in memory of the transform coefficient block is assumed to be row-wise.

```
/* Code for Zig-zag scan */
    UInt uiScanPosLast =       uiBlkPosLast;       // −> Horizontal
scan
    if( uiScanIdx == SCAN_ZIGZAG )                 // −> Zig-zag
                                                       scan
    {
        UInt uiD =             uiPosLastY + uiPosLastX;
        if( uiD < uiWidth )
```

-continued

```
    {
        uiScanPosLast =    ( uiD * ( uiD + 1 ) ) >> 1;
        uiScanPosLast +=   uiD % 2 ? uiPosLastY : uiPosLastX;
    }
    else
    {
        UInt uiDI =        ( (uiWidth-1) << 1 ) - uiD;
        uiScanPosLast =    uiMaxNumCoeffM1 - ( uiDI * ( uiDI +
                           1 ) >> 1 );
        uiScanPosLast -=   uiDI % 2 ? uiWidth - 1 - uiPosLastY :
uiWidth - 1 - uiPosLastX;
    }
}
else if( uiScanIdx == SCAN_VER )           // -> Vertical scan
{
    uiScanPosLast = uiPosLastY +
    (uiPosLastX<<uiLog2BlockSize);
}
```

Video decoder 30 may perform a similar operation with regard to the diagonal scanning order (as opposed to the zig-zag scan discussed above). In such an operation, video decoder 30 may calculate the scan-based LSC indicator in step 214 as uiScanPosLast=uiMaxNumCoeffM1−(uiDI*(uiDI+1)>>1)−uiWidth+1+uiPosLastX, where "uiScanPosLast" is the scan-based LSC indicator, "uiMaxNumCoeffM1" is the maximum number of transform coefficients that the transform coefficient block may have, "uiDI" is the temporary value, "uiWidth" is the width of the transform coefficient block, and "uiPosLastX" is the x-coordinate of the coordinate indicator. The following code describes an example algorithm for converting the coordinate indicator into a scan-based LSC indicator when the assumed scanning order is the diagonal scanning order.

```
/* Code for diagonal scan */
    UInt uiScanPosLast =         uiBlkPosLast;         // -> Horizontal
                                                          scan
    if( uiScanIdx == SCAN_DIAGONAL )                   // -> Diagonal scan
    {
        UInt uiD =               uiPosLastY + uiPosLastX;
        if( uiD < uiWidth )
        {
            uiScanPosLast =      ( uiD * ( uiD + 1 ) ) >> 1;
            uiScanPosLast +=     uiD % 2 ? uiPosLastY : uiPosLastX;
        }
        else
        {
            UInt uiDI =          ( (uiWidth-1) << 1 ) - uiD;
            uiScanPosLast =      uiMaxNumCoeffM1 - ( uiDI * ( uiDI +
1 ) >> 1 ) - uiWidth + 1 + uiPosLastX;
        }
    }
    else if( uiScanIdx == SCAN_VER )                   // -> Vertical scan
    {
        uiScanPosLast = uiPosLastY +
        (uiPosLastX<<uiLog2BlockSize);
    }
```

FIG. 11 is a flowchart that illustrates another example operation 250 to convert a coordinate indicator into a scan-based LSC indicator. As illustrated in the example of FIG. 11, video decoder 30 may store a lookup table (252). The lookup table maps coordinate indicators to scan-based LSC indicators according to the assumed scanning order. For example, if the assumed scanning order is the zigzag scanning order, the lookup table may include an entry that maps the coordinates (1, 1) to the scan-based LSC indicator "5." In some examples, video decoder 30 may store different lookup tables for different assumed scanning orders and different transform coefficient block sizes.

After video decoder 30 stores the lookup table, video decoder 30 may receive the coordinate indicator (254). After receiving the coordinate indicator, video decoder 30 may access the lookup table to retrieve the scan-based LSC indicator that corresponds to the coordinate indicator (256). In some examples, video decoder 30 generates a single value based on the x and y coordinates of the coordinate indicator. For instance, video decoder 30 may generate the single value by multiplying the y-coordinate by a width of the transform coefficient block and then adding the x-coordinate. In such examples, video decoder 30 may use the single value as an index to retrieve the scan-based LSC indicator from the lookup table.

Video decoder 30 may use additional operations to convert coordinate indicators to scan-based LSC indicators. For example, video decoder 30 may use the following pseudo-code to convert a coordinate indicator to a scan-based LSC indicator when the assumed scanning order is a sub-block diagonal scanning order. In this sub-block diagonal scanning order, video decoder 30 processes sub-blocks in a top-right to bottom-left diagonal order and scans transform coefficients within each of the sub-blocks in a top-right to bottom-left diagonal order.

```
    uiScanPosLast =      0;
    UInt sWidth =        uiWidth >> 2;
    UInt sX =            uiPosLastX >> 2;
    UInt sY =            uiPosLastY >> 2;
    UInt uiDs =          sX + sY;
    if( uiDs < sWidth )
    {
        uiScanPosLast +=     sX + (( uiDs * ( uiDs + 1 ) ) >> 1);
    }
    else
    {
        UInt uiDI =          ( (sWidth-1) << 1 ) - uiDs;
        uiScanPosLast +=     sWidth*(sWidth-1) - ( uiDI * ( uiDI + 1
) >> 1 ) + sX;
    }
    uiPosLastX -=        sX<<2;
    uiPosLastY -=        sY<<2;
    uiScanPosLast <<=    4;
    UInt uiD =           uiPosLastY + uiPosLastX;
    if( uiD < 4 )
    {
        uiScanPosLast +=     uiPosLastX + (( uiD * ( uiD + 1 ) ) >>
1);
    }
    else
    {
        UInt uiDI =      6 - uiD;
        uiScanPosLast += 12 - ( uiDI * ( uiDI + 1 ) >> 1 ) +
uiPosLastX;
    }
```

In the pseudo-code above, the "uiWidth" indicates a width of the transform coefficient block, "uiPosLastX" indicates an x-coordinate of the coordinate indicator, "uiPosLastY" indicates a y-coordinate of the coordinate indicator, and "uiScanPosLast" indicates the scan-based LSC indicator. "sX" indicates the x-coordinate of the top-left transform coefficient of the sub-block containing the coordinates indicated by the coordinate indicator. "sY" indicates the y-coordinate of the top-left transform coefficient of the sub-block containing the coordinates indicated by the coordinate indicator. The pseudo-code above may represent a combination of operations to convert the coordinate indicator to a scan-based LSC indicator because the pseudo-code above first performs an operation to determine the scan order ("uiScanPosLast") of the sub-block that contains the coordinates indicated by the coordinate indicator and then performs an operation to determine the scan order within the sub-block of the coordinates indicated by the coordinate indicator.

FIG. 12 is a flowchart that illustrates an example iterative operation 300 to convert a coordinate indicator into a scan-based LSC indicator. After video decoder 30 starts operation 300, video decoder 30 may receive a coordinate indicator (302). Video decoder 30 may then set a position indicator to indicate a first position of the transform coefficient block according to the assumed scanning order (304). For example, if the assumed scanning order starts at the DC transform component, video decoder 30 may set the position indicator to indicate the position at coordinates (0,0). In addition, video decoder 30 may initialize a scan-based LSC indicator to zero (306).

Video decoder 30 may then determine whether the position indicated by the position indicator is same as the position indicated by the coordinate indicator (308). In other words, video decoder 30 may determine whether the indicated positions match. If the position indicated by the position indicator is the same as the position indicated by the coordinate indicator, the scan-based LSC indicator indicates the ordinal position of the substitute coefficient. Video decoder 30 may use a lookup table (denoted by scan[ . . . ] in the pseudo-code below) to determine whether the position indicated by the position indicator is the same as the position indicated by the coordinate indicator.

In response to determining that the position indicated by the position indicator is not the position indicated by the coordinate indicator ("NO" of 308), video decoder 30 may increment the scan-based LSC indicator (310). Video decoder 30 may then advance the position indicated by the position indicator according to the assumed scanning order (312). For example, if the assumed scanning order is the horizontal scanning order and the position indicator currently indicates the position (3, 4), video decoder 30 may advance the position indicated by the position indicator such that the position indicator indicates the position (4, 4).

After advancing the position indicator, video decoder 30 may repeat steps 308-314 with the advanced position indicator. If the position indicated by the position indicator is the position indicated by the coordinate indicator ("YES" of 308), video decoder 30 may end operation 300.

The following pseudo-code may describe the operation of FIG. 12 to convert a coordinate indicator into a scan-based LSC indicator. In this pseudo-code, video decoder 30 checks each scan position to determine whether the corresponding block-based position is the position indicated by the coordinate indicator. Video decoder 30 stops checking positions when the current scan position ("uiBlkPosLast") is equal to the coordinate indicator ("uiBlkPos").

```
for( uiScanPosLast = 0; uiScanPosLast < uiMaxNumCoeffM1;
uiScanPosLast++ )
{
    UInt uiBlkPos = scan[ uiScanPosLast ];
    if( uiBlkPosLast == uiBlkPos )
    {
        break;
    }
}
```

Figure 13:
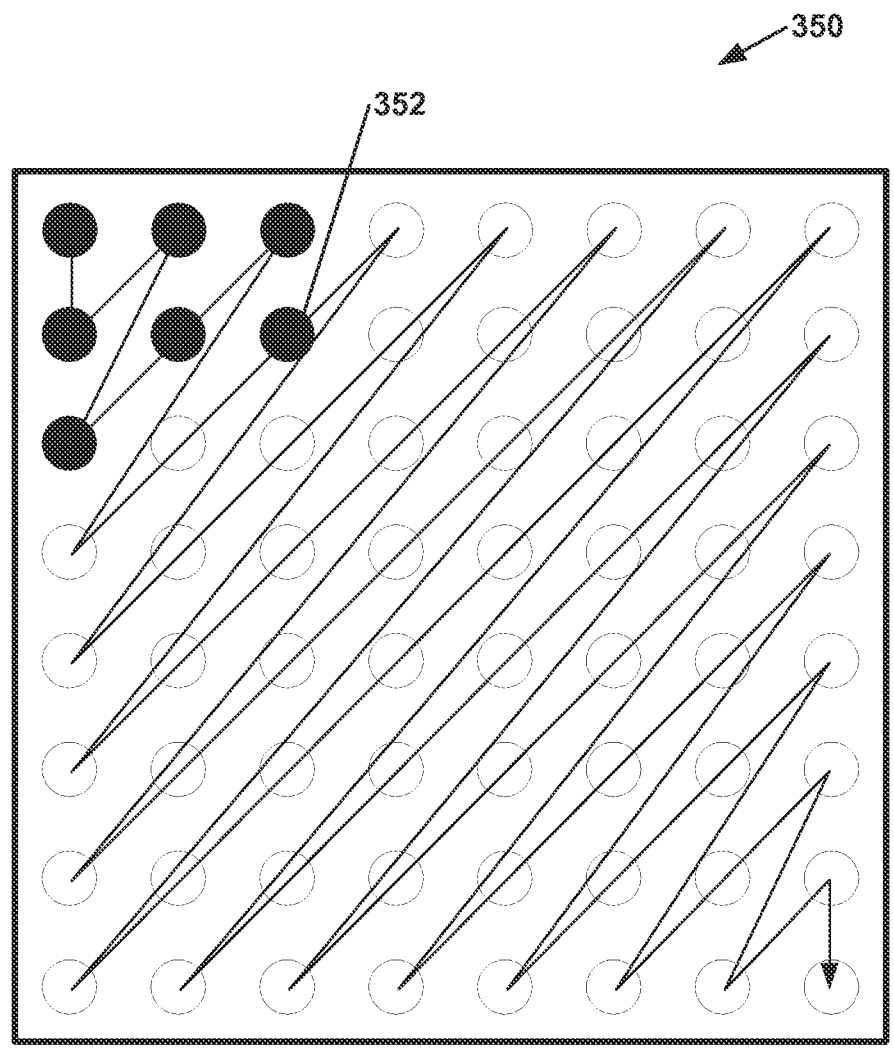
FIG. 13 is a conceptual diagram of a transform coefficient block showing a last significant coefficient.

FIG. 13 is a conceptual diagram of a transform coefficient block 350 showing a last significant transform coefficient. In the example of FIG. 13, each circle represents a different transform coefficient in transform coefficient block 350. Black circles in FIG. 13 correspond to significant transform coefficients and white circles correspond to non-significant transform coefficients. Transform coefficient 352 is the last significant transform coefficient of transform coefficient block 350 according to a diagonal scanning order. FIG. 13 represents the diagonal scanning order as an arrow running through the circles. Assuming that the top row of transform coefficient block 350 is row 0, the leftmost column is column 0, and the diagonal scanning order is the assumed scanning order, the coordinate indicator for transform coefficient 352 indicates coordinates (2, 1). The scan-based LSC indicator for transform coefficient 352 may be the number "7."

It is to be recognized that depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method for encoding video data, the method comprising:
   receiving, by a processor comprising a circuit, a picture of the video data;
   generating, by the processor, a residual video block by subtracting a predicted video block for a coding unit (CU) of the picture from an original sample block of the CU;
   generating, by the processor, a transform coefficient block by applying one or more transforms to the residual video block;
   determining, by the processor, a last significant transform coefficient of the transform coefficient block is at an n'th position of the transform coefficient block scanned according to a coding scanning order, wherein the transform coefficient block comprises transform coefficients associated with the video data, wherein n is a single integer, and the transform coefficient block is a two-dimensional block having a horizontal dimension and a vertical dimension;
   determining, by the processor, values in a significance map for the transform coefficient block, wherein the values in the significance map are sequenced in the coding scanning order;
   identifying, by the processor, a single given transform coefficient in the transform coefficient block, the single given transform coefficient being at the n'th position of the transform coefficient block scanned according to an assumed scanning order that is different than the coding scanning order;
   generating, by the processor, a coordinate indicator specifying an x coordinate and a y coordinate of the single given transform coefficient in the transform coefficient block, wherein the x coordinate is along the horizontal dimension and the y coordinate is along the vertical dimension;
   performing, by the processor, an entropy encoding operation on the coordinate indicator to generate an entropy encoded version of the coordinate indicator; and
   outputting, by the processor, a bitstream that includes the entropy encoded version of the coordinate indicator.

2. The method of claim 1, further comprising:
   using the coding scanning order to generate level information for the transform coefficient block;
   performing an entropy encoding operation on the level information to generate an entropy encoded version of the level information; and
   outputting, in the bitstream, the entropy encoded version of the level information.

3. The method of claim 1, wherein the assumed scanning order starts at a top left corner of the transform coefficient block.

4. The method of claim 1, further comprising:
   performing intra prediction on a prediction unit (PU) of the CU to generate the predicted video block; and
   quantizing transform coefficients in the transform coefficient block.

5. The method of claim 1, wherein the assumed scanning order is a sub-block scanning order and the coding scanning order is selected from among: a horizontal scanning order, a vertical scanning order, a diagonal scanning order, and a zigzag scanning order.

6. A method for decoding video data, the method comprising:
   receiving, by a processor comprising a circuit, a bitstream that includes an encoded version of a significance map and a coordinate indicator specifying an x coordinate and a y coordinate of a single given transform coefficient in the transform coefficient block, the transform coefficient block comprising transform coefficients associated with the video data, the transform coefficient block being a two-dimensional block having a horizontal dimension and a vertical dimension, the significance map comprising values that indicate whether corresponding transform coefficients in the transform coefficient block are significant, the values in the significance map being sequenced according to the coding scanning order;
   converting, by the processor, the coordinate indicator into a scan-based last significant coefficient (LSC) indicator, the converting assuming that a scanning order of the transform coefficient block is an assumed scanning order, the scan-based LSC indicator specifying a value n, wherein n is a single integer, the single given transform coefficient is at the n'th position of the transform coefficient block scanned according to the assumed scanning order and the coding scanning order, a last significant transform coefficient of the transform coefficient block scanned according to the coding scanning order is at the n'th position of the transform coefficient block scanned according to the coding scanning order, the coding scanning order is different than the assumed scanning order, and values in the significance map are sequenced in the coding scanning order;
   using, by the processor, the scan-based LSC indicator to entropy decode the significance map;
   after entropy decoding the significance map, using, by the processor, the significance map to recreate the transform coefficient block;
   after recreating the transform coefficient block, inverse quantizing, by the processor, the transform coefficient block;
   after inverse quantizing the transform coefficient block, generating, by the processor, residual data by applying an inverse transform to the transform coefficient block; and
   after generating residual data and a predicted video block, reconstructing, by the processor, a video block of a picture of the video data based on the residual data and the predicted video block.

7. The method of claim 6, wherein using the significance map to recreate the transform coefficient block comprises:
   after entropy decoding the significance map, recreating the transform coefficient block based on the significance map and level information of the transform coefficient block, the level information including absolute values of significant transform coefficients in the transform coefficient block.

8. The method of claim 7, further comprising:
   determining an intra prediction mode;
   determining the coding scanning order based on the intra prediction mode; and
   performing intra-prediction to generate a predicted video block.

9. The method of claim 6, wherein converting the coordinate indicator comprises performing a non-iterative algorithm that derives the scan-based LSC indicator from the coordinate indicator.

10. The method of claim 6, wherein converting the coordinate indicator comprises accessing a data structure that maps coordinates to scan-based LSC indicators.

11. The method of claim 6, wherein converting the coordinate indicator comprises:

performing a loop operation that scans through positions in the transform coefficient block according to the assumed scanning order until a position having the coordinates is reached; and incrementing the scan-based LSC indicator for each position of the transform coefficient block prior to the position having the coordinates.

12. The method of claim 6, wherein the assumed scanning order is a sub-block scanning order and the coding scanning order is selected from among: a horizontal scanning order, a vertical scanning order, a diagonal scanning order, and a zigzag scanning order.

13. A video encoding device for encoding video data, the video encoding device comprising:
a storage medium configured to store the video data; and
one or more processors configured to:
receive a picture of the video data;
generate a residual video block by subtracting a predicted video block for a coding unit (CU) of the picture from an original sample block of the CU;
generate a transform coefficient block by applying one or more transforms to the residual video block;
determine a last significant transform coefficient of the transform coefficient block is at an n'th position of the transform coefficient block scanned according to a coding scanning order, the transform coefficient block comprising transform coefficients associated with the video data, wherein n is a single integer, and the transform coefficient block is a two-dimensional block having a horizontal dimension and a vertical dimension;
determine values in a significance map for the transform coefficient block, wherein the values in the significance map are sequenced in the coding scanning order;
identify a single given transform coefficient in the transform coefficient block, the single given transform coefficient being at the n'th position of the transform coefficient block scanned according to an assumed scanning order that is different than the coding scanning order;
generate a coordinate indicator specifying an x coordinate and a y coordinate of the single given transform coefficient in the transform coefficient block, wherein the x coordinate is along the horizontal dimension and the y coordinate is along the vertical dimension;
perform an entropy coding operation on the coordinate indicator to generate an entropy encoded version of the coordinate indicator; and
output a bitstream that includes the entropy encoded version of the coordinate indicator.

14. The video encoding device of claim 13, wherein the one or more processors are configured to:
use the coding scanning order to generate level information for the transform coefficient block;
perform an entropy encoding operation on the level information to generate an entropy encoded version of the level information; and
output the entropy encoded version of the level information.

15. The video encoding device of claim 13, wherein the assumed scanning order starts at a top left corner of the transform coefficient block.

16. The video encoding device of claim 13, wherein the one or more processors are configured to:

perform intra prediction on a prediction unit (PU) of the CU to generate the predicted video block; and
quantize transform coefficients in the transform coefficient block.

17. The video encoding device of claim 13, wherein the assumed scanning order is a sub-block scanning order and the coding scanning order is selected from among: a horizontal scanning order, a vertical scanning order, a diagonal scanning order, and a zigzag scanning order.

18. A video decoding device for decoding video data, the video decoding device comprising:
a storage medium configured to store the video data; and
one or more processors configured to:
receive a bitstream that includes an encoded version of a significance map and a coordinate indicator specifying an x coordinate and a y coordinate of a single given transform coefficient in a transform coefficient block, the transform coefficient block comprising transform coefficients associated with the video data, the transform coefficient block being a two-dimensional block having a horizontal dimension and a vertical dimension, the significance map comprising values that indicate whether corresponding transform coefficients in the transform coefficient block are significant, the values in the significance map being sequenced according to the coding scanning order;
convert the coordinate indicator into a scan-based last significant coefficient (LSC) indicator, the converting assuming that a scanning order of the transform coefficient block is an assumed scanning order, the scan-based LSC indicator specifying a value n, wherein n is a single integer, the single given transform coefficient is at the n'th position of the transform coefficient block scanned according to the assumed scanning order and the coding scanning order, a last significant transform coefficient of the transform coefficient block scanned according to the coding scanning order is at the n'th position of the transform coefficient block scanned according to the coding scanning order, the coding scanning order is different than the assumed scanning order, and values in the significance map are sequenced in the coding scanning order;
use the scan-based LSC indicator to entropy decode the significance map;
after entropy decoding the significance map, use the significance map to recreate the transform coefficient block;
after recreating the transform coefficient block, inverse quantize the transform coefficient block;
after inverse quantizing the transform coefficient block, generate residual data by applying an inverse transform to the transform coefficient block; and
after generating residual data and a predicted video block, reconstruct a video block of a picture of the video data based on the residual data and the predicted video block.

19. The video decoding device of claim 18, wherein the one or more processors are configured such that when the one or more processors decode the significance map, the one or more processors recreate the transform coefficient block based on the significance map and level information of the transform coefficient block, the level information including absolute values of significant transform coefficients in the transform coefficient block.

20. The video decoding device of claim 19, wherein the one or more processors are configured to:
  determine an intra prediction mode;
  determine the coding scanning order based on the intra prediction mode; and
  perform intra-prediction to generate a predicted video block.

21. The video decoding device of claim 18, wherein the one or more processors are configured to convert the coordinate indicator at least in part by performing a non-iterative algorithm that derives the scan-based LSC indicator from the coordinate indicator.

22. The video decoding device of claim 18, wherein the one or more processors are configured to convert the coordinate indicator into the scan-based LSC indicator at least in part by accessing a data structure that maps coordinates to scan-based LSC indicators.

23. The video decoding device of claim 18, wherein the one or more processors are configured to convert the coordinate indicator into the scan-based LSC indicator at least in part by:
  performing a loop operation that scans through positions in the transform coefficient block according to the assumed scanning order until a position having the coordinates is reached; and
  incrementing the scan-based LSC indicator for each position of the transform coefficient block prior to the position having the coordinates.

24. The video decoding device of claim 18, wherein the assumed scanning order is a sub-block scanning order and the coding scanning order is selected from among: a horizontal scanning order, a vertical scanning order, a diagonal scanning order, and a zigzag scanning order.

25. A video encoding device for encoding video data, the video encoding device comprising:
  a storage medium configured to store the video data; and
  one or more processors comprising one or more circuits configured to:
    receive a picture of the video data;
    generate a residual video block by subtracting a predicted video block for a coding unit (CU) of the picture from an original sample block of the CU;
    generate a transform coefficient block by applying one or more transforms to the residual video block;
    determine a last significant transform coefficient of the transform coefficient block is at an n'th position of the transform coefficient block scanned according to a coding scanning order, the transform coefficient block comprising transform coefficients, wherein n is a single integer, and the transform coefficient block is a two-dimensional block having a horizontal dimension and a vertical dimension;
    determine values in a significance map for the transform coefficient block, wherein the values in the significance map are sequenced in the coding scanning order;
    identify a single given transform coefficient in the transform coefficient block, the single given transform coefficient being at the n'th position of the transform coefficient block scanned according to an assumed scanning order that is different than the coding scanning order;
    generate a coordinate indicator specifying an x coordinate and a y coordinate of the single given transform coefficient in the transform coefficient block, wherein the x coordinate is along the horizontal dimension and the y coordinate is along the vertical dimension;
    perform an entropy encoding operation on the coordinate indicator to generate an entropy encoded version of the coordinate indicator; and
    output, bitstream that includes the entropy encoded version of the coordinate indicator.

26. A video decoding device for decoding video data, the video decoding device comprising:
  a storage medium configured to store the video data; and
  one or more processors comprising one or more circuits configured to:
    receive a bitstream that includes an encoded version of a significance map and a coordinate indicator specifying an x coordinate and a y coordinate of a single given transform coefficient in a transform coefficient block, the transform coefficient block comprising transform coefficients associated with the video data, the transform coefficient block being a two-dimensional block having a horizontal dimension and a vertical dimension, the significance map comprising values that indicate whether corresponding transform coefficients in the transform coefficient block are significant, the values in the significance map being sequenced according to the coding scanning order;
    convert the coordinate indicator into a scan-based last significant coefficient (LSC) indicator, the converting assuming that a scanning order of the transform coefficient block is an assumed scanning order, the scan-based LSC indicator specifying a value n, wherein n is a single integer, the single given transform coefficient is at the n'th position of the transform coefficient block scanned according to the assumed scanning order and the coding scanning order, a last significant transform coefficient of the transform coefficient block scanned according to the coding scanning order is at the n'th position of the transform coefficient block scanned according to the coding scanning order, the coding scanning order is different than the assumed scanning order, and values in the significance map are sequenced in the coding scanning order;
    use the scan-based LSC indicator to decode the significance map;
    use, after entropy decoding the significance map, the significance map to recreate the transform coefficient block;
    inverse quantize, after recreating the transform coefficient block, the transform coefficient block;
    generate, after inverse quantizing the transform coefficient block, residual data by applying an inverse transform to the transform coefficient block; and
    reconstruct, after generating residual data and a predicted video block, a video block of a picture of the video data based on the residual data and the predicted video block.

27. A non-transitory computer-readable storage medium having instructions stored thereon for encoding video data, the instructions when executed configure one or more processors to:
  receive a picture of the video data;
  generate a residual video block by subtracting a predicted video block for a coding unit (CU) of the picture from an original sample block of the CU;

generate a transform coefficient block by applying one or more transforms to the residual video block;

determine a last significant coefficient (LSC) of the transform coefficient block is at an n'th position of the transform coefficient block scanned according to a coding scanning order, the transform coefficient block comprising transform coefficients, wherein n is a single integer, and the transform coefficient block is a two-dimensional block having a horizontal dimension and a vertical dimension;

determine values in a significance map for the transform coefficient block, wherein the values in the significance map are sequenced in the coding scanning order;

identify a single given transform coefficient in the transform coefficient block, the single given transform coefficient being at the n'th position of the transform coefficient block scanned according to an assumed scanning order that is different than the coding scanning order;

generate a coordinate indicator, the coordinate indicator specifying an x coordinate and a y coordinate of the single given transform coefficient in the transform coefficient block, and the transform coefficient block is a two-dimensional block having a horizontal dimension and a vertical dimension;

perform an entropy encoding operation on the coordinate indicator to generate an entropy encoded version of the coordinate indicator; and output a bitstream that includes the entropy encoded version of the coordinate indicator.

28. A non-transitory computer-readable storage medium having instructions stored thereon for decoding video data, the instructions, when executed, configure one or more processors to:

receive a bitstream that includes an encoded version of a significance map and a coordinate indicator specifying an x coordinate and a y coordinate of a single given transform coefficient in a transform coefficient block, the transform coefficient block comprising transform coefficients, the transform coefficient block being a two-dimensional block having a horizontal dimension and a vertical dimension, the significance map comprising values that indicate whether corresponding transform coefficients in the transform coefficient block are significant, the values in the significance map being sequenced according to the coding scanning order;

convert the coordinate indicator into a scan-based last significant coefficient (LSC) indicator, the converting assuming that a scanning order of the transform coefficient block is an assumed scanning order, the scan-based LSC indicator specifying a value n, wherein n is a single integer, the single given transform coefficient is at the n'th position of the transform coefficient block scanned according to the assumed scanning order and the coding scanning order, a last significant transform coefficient of the transform coefficient block scanned according to the coding scanning order is at the n'th position of the transform coefficient block scanned according to the coding scanning order, the coding scanning order is different than the assumed scanning order, and values in the significance map are sequenced in the coding scanning order use the scan-based LSC indicator to decode the significance map;

after entropy decoding the significance map, use the significance map to recreate the transform coefficient block;

after recreating the transform coefficient block, inverse quantize the transform coefficient block;

after inverse quantizing the transform coefficient block, generate residual data by applying an inverse transform to the transform coefficient block; and after generating residual data and a predicted video block, reconstruct a video block of a picture of the video data based on the residual data and the predicted video block.

29. The method of claim 6, the method being executable on a wireless communication device, wherein the wireless communication device comprises:

a memory configured to store video data;

a processor configured to execute instructions to process the video data stored in said memory; and a receiver configured to receive the bitstream.

30. The method of claim 29, wherein the wireless communication device is a cellular telephone and the bitstream is received by the receiver and modulated according to a wireless communication protocol.

31. The video decoding device of claim 18, wherein the video decoding device is a wireless communication device, further comprising:

a receiver configured to receive the bitstream.

32. The device of claim 31, wherein the wireless communication device is a cellular telephone and the bitstream is received by the receiver and modulated according to a wireless communication protocol.

* * * * *